United States Patent
Rathi et al.

(10) Patent No.: US 9,588,563 B2
(45) Date of Patent: Mar. 7, 2017

(54) PROTOCOL FOR MANAGING A CONTROLLABLE POWER ADAPTER ACCESSORY

(71) Applicant: Apple Inc., Cupertino, CA (US)

(72) Inventors: Shailesh Rathi, San Jose, CA (US); Jason J. Yew, Palo Alto, CA (US); Robert J. Walsh, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 77 days.

(21) Appl. No.: 14/669,857

(22) Filed: Mar. 26, 2015

(65) Prior Publication Data

US 2015/0346792 A1    Dec. 3, 2015

Related U.S. Application Data

(60) Provisional application No. 62/005,132, filed on May 30, 2014.

(51) Int. Cl.
*G06F 1/26* (2006.01)
*H02J 7/00* (2006.01)
(Continued)

(52) U.S. Cl.
CPC ............ *G06F 1/266* (2013.01); *G05F 1/625* (2013.01); *H02J 7/00* (2013.01); *H04M 1/72527* (2013.01)

(58) Field of Classification Search
CPC ............ G06F 1/266; H02J 7/00; G05F 1/625
See application file for complete search history.

(56) References Cited

U.S. PATENT DOCUMENTS 5,150,031 A    9/1992    James et al.
5,483,656 A    1/1996    Oprescu et al.
(Continued)

FOREIGN PATENT DOCUMENTS

CN    2724278 Y    9/2005
JP    2007-209055 A    8/2007
(Continued)

OTHER PUBLICATIONS

International Search Report and Written Opinion corresponding to the PCT application No. PCT/US2010/049921, date of mailing Jan. 28, 2011, 13 pages.

*Primary Examiner* — Stefan Stoynov
(74) *Attorney, Agent, or Firm* — Kilpatrick Townsend & Stockton, LLP

(57) ABSTRACT

A host device can manage a controllable power adapter accessory using a communication protocol. Based on information provided by the controllable power adapter accessory as to its power capabilities and the power needs and preferences of the host device, the host device can determine a desired power profile and request power from the accessory conforming to the desired profile. The desired power profile can also depend in part on the power-carrying capability of one or more cables connected between the host device and the accessory. In some instances, the host device and controllable power adapter accessory can be connected via an intermediary accessory that can siphon power from the controllable power adapter accessory, and the host device can manage the power siphoning behavior of the intermediary accessory using the communication protocol.

20 Claims, 12 Drawing Sheets

(51) Int. Cl.
 *G05F 1/62* (2006.01)
 *G05F 1/625* (2006.01)
 *H04M 1/725* (2006.01)

(56) References Cited

U.S. PATENT DOCUMENTS

| | | | |
|---|---|---|---|
| 5,532,945 A | 7/1996 | Robinson | |
| 5,754,027 A | 5/1998 | Oglesbee et al. | |
| 5,799,196 A | 8/1998 | Flannery | |
| 5,845,217 A | 12/1998 | Lindell et al. | |
| 6,012,105 A | 1/2000 | Rubbmark et al. | |
| 6,125,455 A | 9/2000 | Yeo | |
| 6,127,809 A | 10/2000 | Kates et al. | |
| 6,130,518 A | 10/2000 | Gabehart et al. | |
| 6,161,027 A | 12/2000 | Poirel | |
| 6,169,387 B1 | 1/2001 | Kaib | |
| 6,184,652 B1 | 2/2001 | Yang | |
| 6,184,655 B1 | 2/2001 | Malackowski | |
| 6,204,637 B1 | 3/2001 | Rengan | |
| 6,211,649 B1 | 4/2001 | Matsuda | |
| 6,233,625 B1 | 5/2001 | Vander Kamp et al. | |
| 6,271,605 B1 | 8/2001 | Carkner et al. | |
| 6,316,916 B2 | 11/2001 | Bohne | |
| 6,353,894 B1 | 3/2002 | Pione | |
| 6,526,287 B1 | 2/2003 | Lee | |
| 6,614,232 B1 | 9/2003 | Mukai | |
| 6,653,813 B2 | 11/2003 | Khatri | |
| 6,653,816 B2 | 11/2003 | Peek et al. | |
| 6,663,420 B1 | 12/2003 | Xiao | |
| 6,813,528 B1 | 11/2004 | Yang | |
| 6,928,568 B2 | 8/2005 | Breen et al. | |
| 6,995,963 B2 | 2/2006 | Fadell et al. | |
| 7,032,120 B2 | 4/2006 | El-Kik et al. | |
| 7,167,935 B2 | 1/2007 | Hellberg | |
| 7,215,042 B2 | 5/2007 | Yan | |
| 7,293,122 B1 | 11/2007 | Schubert | |
| 7,441,062 B2 | 10/2008 | Novotney et al. | |
| 7,509,505 B2 | 3/2009 | Randall et al. | |
| 7,523,338 B2 | 4/2009 | Fu et al. | |
| 7,558,894 B1 | 7/2009 | Lydon et al. | |
| 7,581,119 B2 | 8/2009 | Tupman et al. | |
| 7,624,202 B2 | 11/2009 | Monks et al. | |
| 7,646,107 B2 * | 1/2010 | Smith | H02J 7/0055 307/11 |
| 7,673,020 B2 | 3/2010 | Rosenbloom et al. | |
| 7,746,032 B2 | 6/2010 | Tupman et al. | |
| 7,770,036 B2 | 8/2010 | Dorogusker et al. | |
| 8,261,100 B2 * | 9/2012 | Paniagua, Jr. | G06F 1/26 320/114 |
| 8,266,348 B2 * | 9/2012 | Trivedi | G06F 1/26 307/151 |
| 2001/0003205 A1 | 6/2001 | Gilbert | |
| 2001/0006884 A1 | 7/2001 | Matsumoto | |
| 2002/0132651 A1 | 9/2002 | Jinnouchi | |
| 2003/0110403 A1 | 6/2003 | Crutchfield et al. | |
| 2003/0220988 A1 | 11/2003 | Hymel | |
| 2004/0003300 A1 | 1/2004 | Malueg et al. | |
| 2004/0067671 A1 | 4/2004 | Eckhart | |
| 2004/0103223 A1 | 5/2004 | Gabehart et al. | |
| 2004/0224638 A1 | 11/2004 | Fadell et al. | |
| 2006/0117195 A1 | 6/2006 | Niwa et al. | |
| 2006/0212726 A1 | 9/2006 | Wang et al. | |
| 2007/0046254 A1 | 3/2007 | Chen et al. | |
| 2007/0088967 A1 | 4/2007 | Fu et al. | |
| 2007/0260896 A1 | 11/2007 | Brundridge et al. | |
| 2008/0065246 A1 | 3/2008 | Zorkendorfer et al. | |
| 2009/0033277 A1 | 2/2009 | Ludtke | |
| 2009/0179768 A1 | 7/2009 | Sander et al. | |
| 2010/0042853 A1 | 2/2010 | Diab et al. | |
| 2010/0180132 A1 | 7/2010 | Wu et al. | |
| 2010/0281183 A1 | 11/2010 | Van Bebber | |
| 2010/0318819 A1 | 12/2010 | Diab | |
| 2011/0137483 A1 | 6/2011 | Jenkins et al. | |
| 2011/0218790 A1 | 9/2011 | Algaonkar et al. | |

FOREIGN PATENT DOCUMENTS

| | | |
|---|---|---|
| TW | 200825699 A | 6/2008 |
| TW | 200950260 A | 12/2009 |
| WO | 99/26330 | 5/1999 |
| WO | 00/39907 | 7/2000 |
| WO | 2008/043404 A1 | 4/2008 |
| WO | 2008/085833 A1 | 7/2008 |

* cited by examiner

500 ↘

| CHARACTERISTIC | TYPE | VALUE |
| --- | --- | --- |
| 502 — ComponentID | uint | (unique ID) |
| 504 — ComponentName | string | (human-readable name) |
| 506 — NumVoltageRanges | int | number of voltage ranges supported |
| 508 — VoltageRangeInfo | field | Vmin<br>Vmax<br>Imax<br>Current limits & times |
| 510 — DiagnosticsVersion | uint | version number of diagnostic data provided |

| MESSAGE | DIRECTION | PARAMETERS |
| --- | --- | --- |
| 602 — SetVoltage | H → A | voltage value |
| 604 — SetMode | H → A | mode: off, auto, normal, burst |
| 606 — StartAdapterUpdates | H → A | identifier(s) of desired update class(es):<br>• Configured voltage<br>• Average voltage<br>• Average current<br>• Average temperature<br>• Thermal limit near<br>• Thermal limit exceeded<br>• Over current protection<br>• Over voltage protection<br>• Mode change<br>• State change<br>• Error |
| 608 — AdapterUpdate | A → H | class identifier, value if applicable |
| 610 — StopAdapterUpdates | H → A | (none) |
| 612 — RequestDiagnostics | H → A | (none) |
| 614 — ReturnDiagnostics | A → H | diagnostic data bundle |

*FIG. 6*

PROTOCOL FOR MANAGING A CONTROLLABLE POWER ADAPTER ACCESSORY

CROSS REFERENCE TO RELATED APPLICATIONS

This application claims the benefit of U.S. Provisional Application No. 62/005,132, filed May 30, 2014, entitled "Protocol for Managing a Controllable Power Adapter Accessory," the disclosure of which is incorporated by reference herein in its entirety.

BACKGROUND

The present disclosure relates generally to electronic devices and in particular to protocols for managing controllable power adapter accessories.

Personal electronic devices are everywhere. Users carry mobile phones, tablets, laptop computers, media players, wireless headsets, and a range of other devices. Such devices are frequently powered by internal batteries that may require recharging. An internal battery can be recharged using a power adapter that can receive standard household electrical current (e.g., 110 V alternating current in the US) and provide output currents and voltages that are matched to what the charging circuitry in the device being charged can handle. A power adapter that provides too little power charges a battery slowly or not at all, while a power adapter that provides too much power can damage the device or the battery. In general, different devices can have different power requirements and limitations. Thus, users often find it necessary to have a separate power adapter for each device.

SUMMARY

Certain embodiments of the present invention relate to management of a controllable power adapter accessory. As used herein, a controllable power adapter accessory can be a power adapter that is capable of reconfiguring itself to supply different levels of power (e.g., different currents and/or voltages) to a connected "host" device (e.g., a personal electronic device), depending on the host device's requirements. A host device can detect and verify that it is connected to a controllable power adapter accessory and can obtain information from the controllable power adapter accessory as to the range of voltages and/or currents (and/or other power characteristics) the accessory can provide. Based on this information and its own configuration data (e.g., power requirements and/or limitations), the host device can enter an enhanced power management mode. In this enhanced mode, the host device can determine its own power needs and preferences and can send messages (e.g., commands) to the controllable power adapter accessory to request that power conforming to a specified power profile be provided by the accessory to the host device. Selection of power profiles can be transparent to the user; all the user needs to do is to connect the host device to the controllable power adapter accessory, and the devices will determine an appropriate or optimal power profile without further user intervention. This can reduce the number of power adapters a user has to keep track of (or pack when traveling).

In some embodiments, a controllable power adapter accessory can be operable in multiple different voltage ranges. For each voltage range, the controllable power adapter accessory can identify a minimum and maximum voltage, a maximum peak current that can be delivered, and other parameters (e.g., current limits and time for which the current limit can be sustained) that may be applicable to that voltage range. The host device can use this information to select a power profile, which can include, e.g., voltage and an operating mode (e.g., normal, burst, or automatic mode). In some embodiments, the host device can indicate the desired voltage, and the controllable power adapter accessory can select a voltage range based on the desired voltage. Selection of a voltage range can also take into account other information, such as the type of host device connected.

In some embodiments, the host device can separately verify that a cable through which the controllable power adapter accessory is connected is also rated for a particular power profile, and the power profile to be used can be based in part on the rating of the cable. Thus, for instance, if a controllable power adapter accessory is capable of delivering up to 12 volts but the cable is only rated for 5 volts, the host device can select a 5-volt power profile. This can protect against damage to the cable, electrical fires, and other risks associated with power overloads. In some embodiments, if power delivery is limited by the cable, the host device can so inform the user, e.g., with a suggestion to upgrade to a higher-rated cable.

Further, while connected to the controllable power adapter accessory, the host device can receive status updates from the accessory. For instance, the host device can send messages to the accessory to subscribe to various classes of status updates (e.g., voltage changes, temperature changes, whether protection features have activated, etc.), and the accessory can send a status update message whenever an update in a subscribed class occurs. The host device can use the status updates, e.g., to help keep the accessory operating optimally by changing the requested power profile if a status update indicates a problem. In addition, based on status updates, the host device can generate user notifications regarding any abnormal behavior in the accessory, such as overheating.

Further, in some embodiments, a host device can be connected to a controllable power adapter accessory through one or more intermediary devices that can relay commands and associated data, as well as power signals, between the host device and the controllable power adapter using various cables. Prior to requesting a particular power profile, the host device can verify that each cable and intermediary device is rated for that power profile, and the profile requested can be based at least in part on the ratings of the cables and intermediary device(s).

In some embodiments, verification of cables, controllable power adapter accessories, and/or other intermediary accessories can be performed using cryptographic algorithms, keys, and certificates that can be securely stored in authentication chips (e.g., integrated circuits) built into each cable and accessory. In the event that a cable or accessory fails to verify its identity when requested to do so by the host device, the host device can determine whether to draw power in a safe mode (e.g., a low power profile that reduces risk of damage) or not to draw power at all. The host device can alert the user when a cable or accessory does not verify its identity.

The following detailed description together with the accompanying drawings will provide a better understanding of the nature and advantages of the present invention.

BRIEF DESCRIPTION OF THE DRAWINGS

FIG. 5 shows a table listing examples of power-adapter-specific characteristics that can be provided during identification according to an embodiment of the present invention.

FIG. 6 shows a table listing examples of power-management messages according to an embodiment of the present invention.

DETAILED DESCRIPTION

Certain embodiments of the present invention relate to management of a controllable power adapter accessory. As used herein, a "controllable power adapter accessory" can include any power adapter that is capable of reconfiguring itself to supply different levels of power (e.g., different current, and/or voltages) to a connected "host" device (e.g., a personal electronic device), depending on the host device's requirements. A host device can detect and verify that it is connected to a controllable power adapter accessory and can obtain information from the controllable power adapter accessory as to the range of voltages and/or currents (and/or other power characteristics) the accessory can provide. Based on this information and its own configuration data (e.g., power requirements and/or limitations), the host device can enter an enhanced power management mode. In this enhanced mode, the host device can determine its own power needs and preferences and can send messages (e.g., commands) to the controllable power adapter accessory to request that power conforming to a specified power profile be provided by the accessory to the host device. Selection of power profiles can be transparent to the user; all the user needs to do is to connect the host device to the controllable power adapter accessory, and the devices will determine an appropriate or optimal power profile without further user intervention.

Figure 1A:
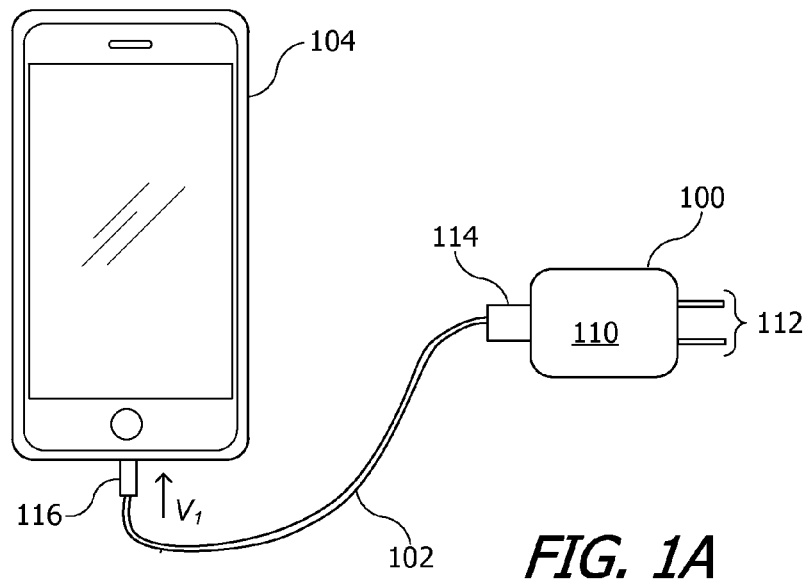
FIGS. 1A and 1B show a controllable power adapter accessory connected to different host devices using a cable according to an embodiment of the present invention.
Figure 1B:
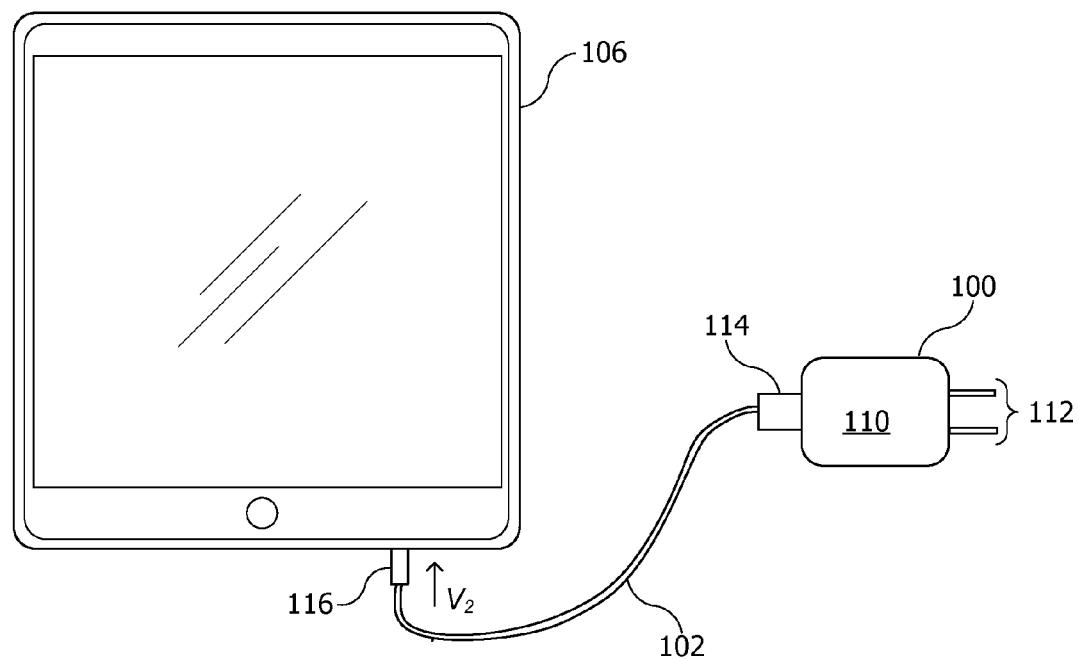

FIGS. 1A and 1B show a controllable power adapter accessory 100 connected to different host devices (e.g., personal electronic devices) using a cable 102 according to an embodiment of the present invention. The host device can be a mobile phone 104 as shown in FIG. 1A, a tablet computer 106 as shown in FIG. 1B, or any other personal electronic device, such as a media player, laptop computer, wearable device, or the like.

Controllable power adapter accessory 100 can include a housing section 110 containing power adapter circuitry (e.g., AC to DC converters, voltage regulators, current regulators, etc.) and a power interface 112 for connecting to a power source (e.g., metal prongs to plug into a conventional electrical outlet). As used herein, a "power adapter" can include any device that is capable of receiving power from a power source, altering one or more characteristics (also referred to as a "power profile") of the received power (e.g., alternating or direct current, voltage, peak or average current, etc.), and delivering the altered power to another device (e.g., a host device). A controllable power adapter can vary the power profile of its delivered power in response to messages received from the host device. Examples are described below.

One end of cable 102 can be detachably secured to controllable power adapter accessory 100 using a connector plug 114 that can be received in a mating receptacle (not shown) of power adapter accessory 100. Similarly, the other end of cable 102 can be detachably secured to host device 104 or 106 using a connector plug 116 that can be received in a mating receptacle (not shown) of host device 104 or 106. Connector plugs 114 and 116 can each include conductive pins that connect to wires running the length of cable 102, thereby establishing an electrical pathway from one end of cable 102 to the other. Connector plugs 114 and 116 can have the same form factor and pin arrangement, or different form factors and/or pin arrangements as desired. In addition, as described below, one or both of connector plugs 114 and 116 (or another portion along the length of cable 102) can include authentication circuitry that allows cable 102 to identify and authenticate itself to a connected personal electronic device.

In FIG. 1A, the host device is a mobile phone 104 that can receive a maximum voltage V1 (e.g., 3 volts or 5 volts or the like). Accordingly, in response to a message (e.g., a command) received from mobile phone 104 requesting voltage V1, controllable power adapter accessory 100 can adjust its power profile such that the output voltage does not exceed V1.

In FIG. 1B, the host device is a tablet computer 106 that can receive a maximum voltage V2 that is different from V1. In this example, V2 is a higher voltage than V1 (e.g., 10 volts, 12 volts or the like). Accordingly, in response to a message (e.g., a command) received from tablet computer 106 requesting voltage V2, controllable power adapter accessory 100 can adjust its power profile such that the output voltage can exceed V1 but does not exceed V2. Thus the same power adapter accessory 100 and cable 102 can be used to charge each of mobile phone 104 and tablet computer 106 (and other host devices as well) using a voltage that can be specified by the host device. This can reduce the number of power adapters needed by a user who has multiple devices without limiting the user to the lowest-voltage power adapter (which may not be adequate to charge higher-power devices). Further, because host devices 104 and 106 can automatically regulate the maximum voltage provided by power adapter 100, a user need not worry about using the "wrong" power adapter, e.g., accidentally connecting a power adapter that outputs V2 to mobile phone 104, which could be damaged if V2 is greater than V1.

As noted above, cable 102 can be capable of identifying and authenticating itself to a host device (e.g., mobile phone 104 or tablet computer 106) independently of power adapter 100. In some embodiments, mobile phone 104 or tablet computer 106 can use identifying information provided by cable 102, or the absence of such information, to determine the power-carrying capability of the cable (also referred to herein as a "rating" or "power rating" of the cable). For instance, if cable 102 is only rated for V1, tablet computer 106 can instruct power adapter accessory 100 to limit its output voltage to V1, even though both power adapter accessory 100 and tablet computer 106 can produce and consume a higher voltage V2. This can protect against damage to or destruction of cable 102.

It will be appreciated that the devices of FIGS. 1A-1B are illustrative and that variations and modifications are possible. A controllable power adapter accessory can have a variety of different form factors and can operate over any number of voltage ranges. Any type of host device can be used with a controllable power adapter accessory in the manner described herein, provided that the host device, power adapter accessory, and cable have compatible hardware interfaces and support the same accessory communication protocol, an example of which is described below.

Figure 2:
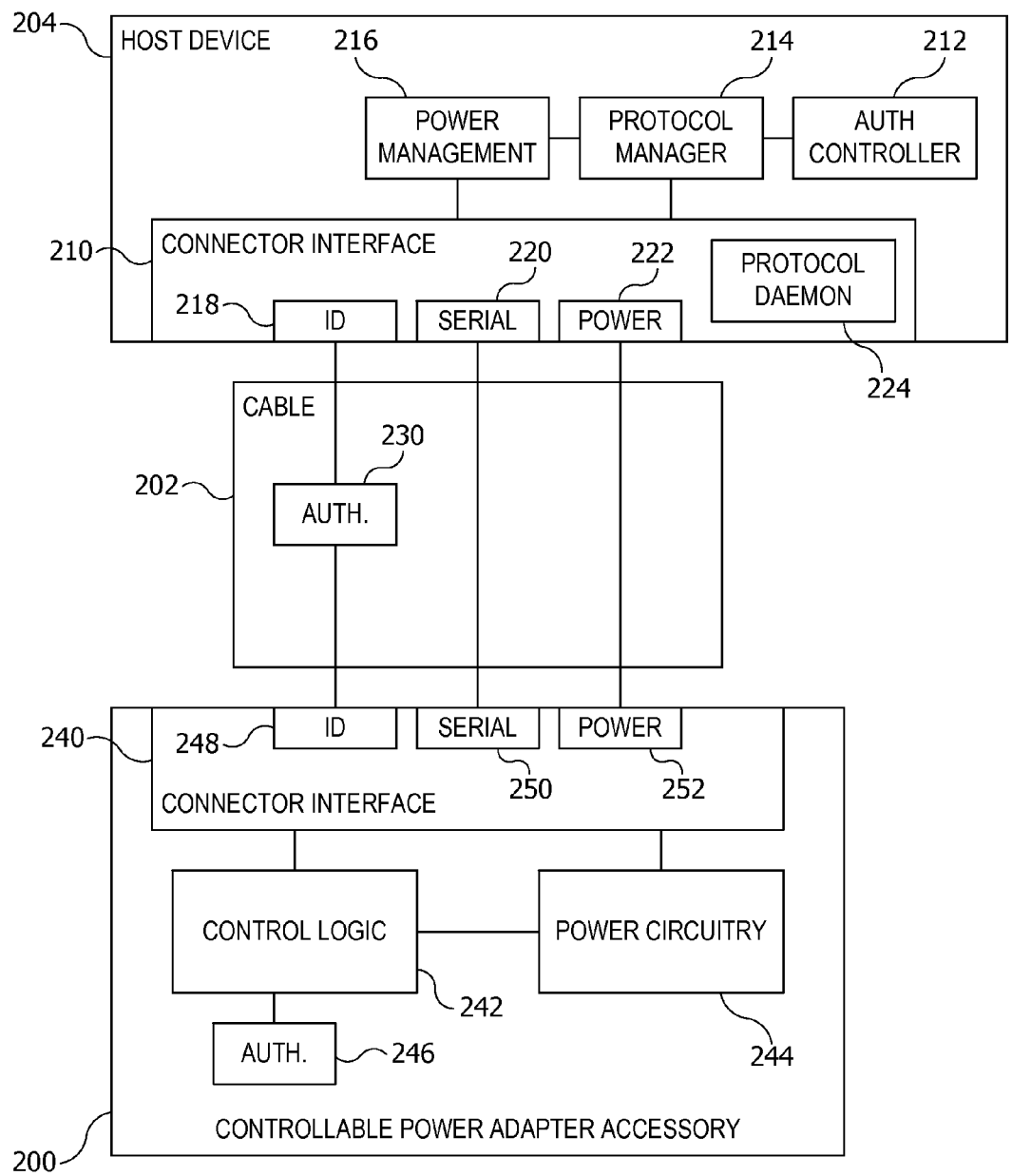
FIG. 2 is a functional block diagram further illustrating connections and communication paths between devices of the type shown in FIGS. 1A and 1B according to an embodiment of the present invention.

FIG. 2 is a functional block diagram further illustrating connections and communication paths between devices of the type shown in FIGS. 1A-1B according to an embodiment of the present invention. Controllable power adapter accessory 200 (e.g., implementing controllable power adapter accessory 100 of FIGS. 1A-1B) connects to one end of a cable 202 (e.g., implementing cable 102 of FIGS. 1A-1B), and the other end of cable 202 connects to a host device 204 (e.g., implementing host devices 104, 106 of FIGS. 1A-1B).

Host device 204 can include a connector interface 210, an authentication controller 212, a protocol manager 214, and a power management unit 216. Connector interface 210 can include control logic to manage various input/output pins that can logically be grouped into "buses," where each bus can include one or more pins. For example, ID bus interface 218 can provide a low-bandwidth signal path for communicating identification and authentication information between devices. In some embodiments, ID bus interface 218 can include a signal pin and a ground pin, a pair of differential signal pins, or the like. Serial bus interface 220 can provide a higher-bandwidth signal path for communicating arbitrary information using various signaling protocols such as USB (D+ and D− pins) or UART (TX and RX pins). Power bus interface 222 can provide power transmission into or out of host device 204 (e.g., using a power pin and a ground pin or just a power pin). In some embodiments, power bus interface 222 can be operated to receive power when host device 204 is connected to a power source such as controllable power adapter accessory 200 and operated to transmit power when host device 204 is connected to a different accessory (not shown) that does not have its own power source or that requests power from host device 204. Power bus interface 222 can also be switched off (e.g., by decoupling internal circuitry from the power pins) in situations where it is desirable to neither receive nor transmit power. The various bus interfaces described herein can be implemented using a single multi-pin receptacle connector, with different pins assigned to different bus interfaces. In some embodiments, two or more bus interfaces can share a pin (e.g., a ground pin).

Power management unit 216 can be implemented, e.g., as an operating system process or firmware process executing on a processor in host device 204. In some embodiments, power management unit 216 can control the state of power bus 222 (e.g., whether it is receiving or transmitting power). Power management unit 216 can also determine the power requirements and preferences of host device 204, such as whether an internal battery should be charged when an external power source is available. Power management unit 216 can also receive information about a connected power-source accessory (e.g., accessory 200) and can determine the desired operating parameters for the accessory (e.g., how much power to draw, power mode, etc.). Power management unit 216 can communicate instructions to protocol manager 214. In some embodiments power management unit 216 can also include circuitry and associated control logic to deliver power to various components of host device 204 and/or to monitor power usage by components of host device 204.

Protocol manager 214, which can be implemented using software objects (e.g., firmware) executing on a processor or other appropriate hardware, can manage communications between processes executing on host device 204 (e.g., power management unit 216, other operating system processes, executing applications, and so on) and external accessories (e.g., accessory 200) connected via connector interface 210. In some embodiments, some accessories can connect wirelessly to host device 204, and protocol manager 214 can manage communications with wireless accessories as well, with communication proceeding via a wireless interface (not shown) in addition to or instead of connector interface 210.

In some embodiments, connector interface 210 can include a protocol daemon 224 that can interact with protocol manager 214 to implement a protocol stack for an accessory communication protocol. The accessory communication protocol (or "accessory protocol") can be a proprietary or open protocol developed by a manufacturer of host devices (e.g., the iPod Accessory Protocol ("iAP") developed by Apple Inc.), and the protocol can be common to all devices within an ecosystem of interoperating host devices (e.g. host device 204) and accessories (e.g., controllable power adapter accessory 200). Examples are described below.

Authentication controller 212 can be implemented, e.g., using a secure storage element to store executable program code and/or a secure processor to execute stored code in a manner that is protected from unauthorized modification or access to sensitive data (e.g., private encryption keys). In operation, authentication controller 212 can perform cryptographic operations (e.g., storage and retrieval of digital certificates, generation of encryption keys, encryption and decryption of messages). Such operations can be used to verify the authenticity of connected accessories and/or cables. For example, as described below, the accessory protocol can define messages that a connected accessory (e.g., accessory 200) or cable (e.g., cable 202) can send to identify and authenticate itself. Such messages can be received by protocol manager 214 and sent to authentication controller 212 for processing. Authentication controller 212 can also generate responses to these messages, which protocol manager 214 can send to the connected accessory (or cable in some instances).

Controllable power adapter accessory 200 can include a connector interface 240, control logic 242, power circuitry 244, and authentication module 246. Connector interface 240 can be generally similar to connector interface 210 of host device 204 and can provide an ID bus interface 248, a serial bus interface 250, and a power bus interface 252, similar to ID bus interface 218, serial bus interface 220, and power bus interface 222 described above. In examples described herein, controllable power adapter accessory 200 is used to transmit power to host device 204, and power bus interface 252 can but need not have the capability to receive power.

Power circuitry 244 can include a port to receive power from an external source such as a wall outlet. In some embodiments, controllable power adapter accessory 200 can also include an onboard power source (e.g., an internal battery, which can be fixedly or removably installed, solar cell, or the like), and power circuitry 244 can receive power from any onboard power source that may be present. Power circuitry 244 can also include power conditioning circuitry (e.g., AC-to-DC converter, current regulators, voltage regulators, etc.) and circuitry for delivering power to power bus interface 222 as well as to power-consuming components within power adapter accessory 200.

Control logic 242 can be implemented using a microprocessor or microcontroller programmed with suitable instructions (e.g., device firmware), application-specific integrated circuit (ASIC), or the like. In operation, control logic 242 can provide control signals to power circuitry 244, e.g., to indicate how much power should be delivered to power bus interface 222. Control logic 242 can also receive signals from power circuitry 244, e.g., indicating current operating parameters (voltage level, current, temperature, etc.) and/or error conditions. Control logic 242 can incorporate programmable or fixed-function circuitry to send and receive messages conforming to the accessory communication protocol used by host device 204. For instance, control logic 242 can implement operations similar to protocol manager 214 and/or protocol daemon 224 in host device 200.

Authentication module 246 can be, e.g., an integrated circuit or secure processing element, similar to authentication controller 212 described above. In operation, authentication module 246 can perform cryptographic operations (e.g., storage and retrieval of a digital certificate, generation of encryption keys, encryption and decryption of messages). Such operations can be used to verify the authenticity of accessory 200 to other devices (e.g., to host device 204). For example, as described below, control logic 242 can receive accessory-protocol messages requesting that accessory 200 present a digital certificate and/or verify its identity by digitally signing a message. Control logic 242 can invoke functions of authentication module 246 to perform the requested operations and can communicate the results to host device 204.

Cable 202 can include an authentication module 230 (which can be, e.g., an integrated circuit). Authentication module 230 can be disposed within the housing of a plug connector (or receptacle connector, depending on cable design) at either end of cable 202 or somewhere along the length of cable 202. As shown, authentication module 230 can be connected, e.g., via wires and/or pins, to ID bus interface 218 of connector interface 210 of host device 204. In the event that cable 202 is symmetric, authentication module 230 can also connect to ID bus interface 248 of controllable power adapter accessory 200. Authentication module 230 can be generally similar to authentication module 246, although authentication communications via ID bus interface 218 may use a simplified protocol or protocol stack.

It will be appreciated that the system configurations and components described herein are illustrative and that variations and modifications are possible. The host device and/or accessory may have other capabilities not specifically described herein (e.g., mobile phone, global positioning system (GPS), wireless data communication, media storage and playback, etc.). Connections described as being provided by wires and pins can be provided by other technologies such as optical signal paths or other media that allow signals to propagate between devices.

Further, while host devices and accessories are described herein with reference to particular blocks, it is to be understood that these blocks are defined for convenience of description and are not intended to imply a particular physical arrangement of component parts. Further, the blocks need not correspond to physically distinct components, and the same physical components can be used to implement aspects of multiple blocks. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Connector interface 210 of host device 204 and connector interface 240 of accessory 200 allow host device 204 to be connected with accessory 200 and subsequently disconnected from accessory 200. As used herein, a host device and an accessory are "connected" whenever a communication channel specifically designated for accessory protocol communication is established between their respective connector interfaces and "disconnected" when the channel is terminated. In some embodiments described herein, an indirect physical connection is made using cable 202. However, it is also possible for host device 204 and accessory 200 to establish a direct physical connection; for example, accessory 200 may provide a plug connector that is compatible with a receptacle connector of host device 204. In some instances, host device 204 and accessory 200 can have wireless interfaces (e.g., Wi-Fi, Bluetooth, or the like) and some or all messages can be communicated using a wireless connection. Power can also be transmitted wirelessly, e.g., using inductive charging techniques. Thus, although the description focuses on wired connections, other embodiments can be implemented using optical and/or wireless connections, as well as combinations thereof.

As noted above, host device 204 and accessory 200 can communicate while connected by exchanging messages and data according to an accessory protocol. The messages and data can be communicated, e.g., using a transport medium provided by connector interfaces 210, 240 (e.g., serial bus interface 220 connected to serial bus interface 250). The accessory protocol can be largely or entirely transport-agnostic; that is, the same message and data formats can be used regardless of the transport medium (e.g., wired or wireless) or transport-level protocol that provides the channel via which accessory-protocol messages and data are exchanged. In some instances, the accessory protocol may specify a sequence of operations to establish a channel, and some or all these operations may be specific to a particular transport medium or transport-level protocol.

The accessory protocol can define a "universe" of messages that can be exchanged between host device 204 and accessories connected thereto, such as accessory 200. The message format can include, e.g., a start bit or bit sequence to indicate that what follows is a message code, followed by an actual message code that can be interpreted and acted on by the recipient. At least some of the message codes may have one or more associated parameters defined by the protocol, and a message can include values for any such parameters in addition to the message code. In some instances, the protocol can further specify a behavior for a recipient in the event that a particular parameter associated with a message code is not received or in the event that an unexpected parameter is received with a message code. The number of parameters can be different for different messages, and in some instances, a parameter may have variable length. In some embodiments, the message codes can be defined such that a given message code is valid in only one direction. Other message structures can also be used.

In some embodiments, the universe of messages defined by the accessory protocol can be logically grouped into a "general" message set and an "optional" message set. Every accessory and every host device that use the accessory protocol can be required to support at least the general message set. This message set can include messages enabling the host device and the accessory to identify and authenticate themselves to each other and to provide information about their respective capabilities, including which (if any) of the messages in the optional set each supports. For example, the general message set can include a "detect" message or series of messages that the accessory and host device can exchange to initiate accessory-protocol communication, a "request identify" message that the host can send to the accessory in response to the detect message to request that the accessory identify itself, and an identification message (or sequence of messages) that the accessory can send to the host to provide identifying information. Identification can include, for example, providing basic information about the accessory device such as manufacturer, model name, serial number, firmware version, device class information; listing specific messages in the optional message set that the device is capable of sending and/or receiving; providing information about input/output capabilities, encryption capabilities; and so on. The general message set can also include authentication messages that the host device can use to verify the purported identity and capabilities of the accessory (or vice versa), and the accessory (or host device) may be blocked from invoking certain (or all) of the optional messages if the authentication is unsuccessful. Additional examples of identification and authentication messages are described below.

The optional message set can include messages related to various functionality that might or might not be supported in a given accessory. For example, the optional message set can include messages related to controlling the power provided by controllable power adapter accessory 200 and/or communicating status of controllable power adapter accessory 200 to host device 204. Other examples of optional messages include simple remote control messages that allow an accessory to identify a function of the host device to be invoked, remote user interface messages that can be used to obtain information related to replicating all or part of a user interface of a host device on an accessory (thereby supporting a more advanced remote control), messages that allow a user to control a radio tuner in an accessory by operating a host device and/or to control a radio tuner in a host device by operating an accessory, messages that facilitate transfers of data objects between the host device and the accessory, and so on. Any combination of optional messages can be defined in an accessory protocol, and there is no requirement that a given accessory or host device support all (or even any) of the optional messages.

Figure 3:
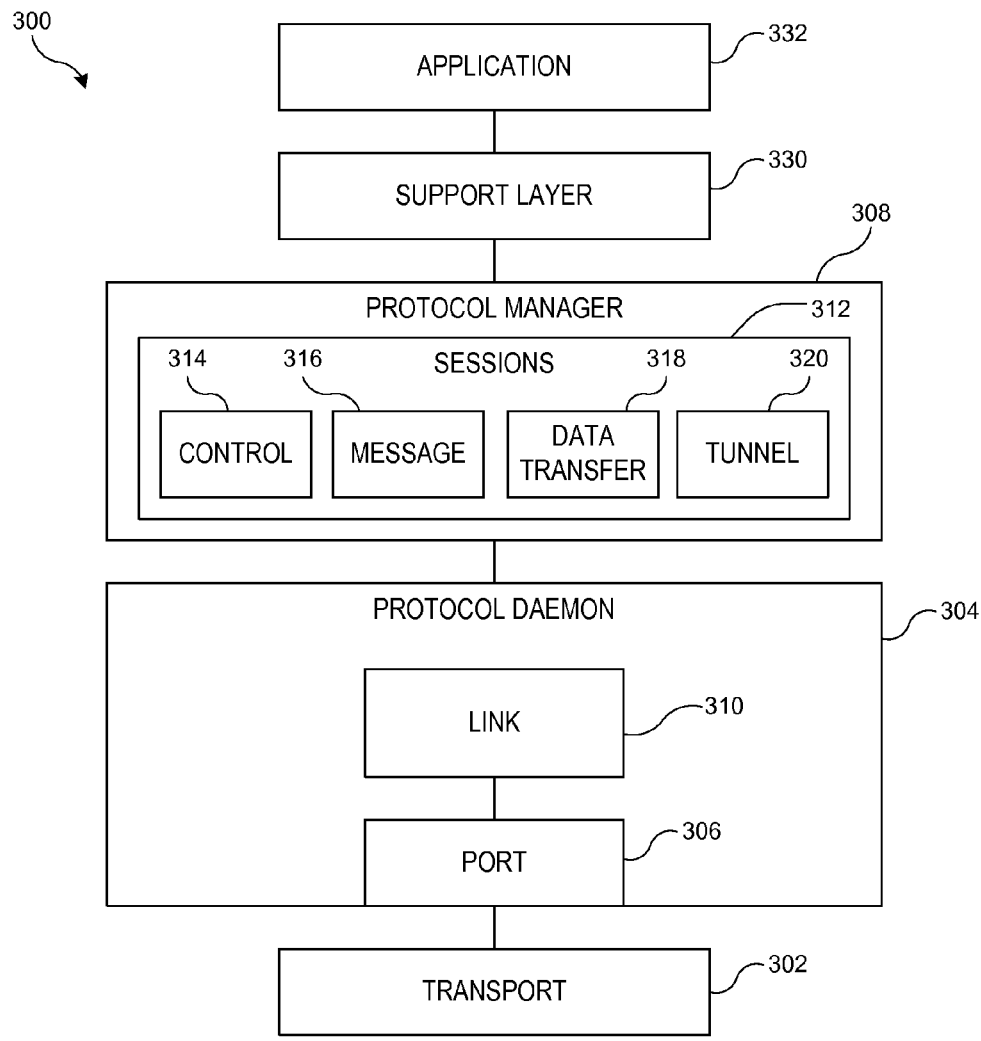
FIG. 3 is a block diagram showing further details of processes within a host device according to an embodiment of the present invention.

FIG. 3 is a block diagram showing further details of processes within host device 204 according to an embodiment of the present invention. The various processes shown can provide a protocol stack 300. A similar protocol stack can be implemented in accessory 200. In some embodiments, multiple processor chips or multiple processor cores within a single chip can be used to implement the various processes. Some or all of the processors can be programmable general-purpose processors executing software and/or firmware programs, or some or all can be digital signal processors, state machines with built-in functionality, or any combination thereof. Protocol stack 300 can be used for accessory-protocol communication Physical transport 302 can include antennas, signal pins, drivers, digital-to-analog converters, encoders, RF circuitry, and other components operable to send and receive signals on a physical transport such as a pin, a wire, or an optical fiber; a wireless transport (e.g., an RF carrier wave); or the like. The particular details depend on the transport, and conventional or other transports can be used. In some embodiments, physical transport 302 implements a wired transport that can provide one or more distinct ports 306 for communicating with host device 204. In some instances, different ports of host device 204 can have different associated protocol stacks. Thus, for example, physical transport 302 can route to port 306 any incoming communications from an accessory with which an accessory-protocol connection to port 306 has been established and can route communications from other devices to other ports of the host device (not shown in FIG. 3).

Protocol daemon 304 (e.g., corresponding to protocol daemon 224 of FIG. 2) can control accessory protocol communications by managing various physical or virtual ports. In some embodiments, protocol daemon 304 can define a port 306 corresponding to each established connection to an accessory. Although only one port 306 is shown, some embodiments allow multiple concurrent connections to accessories, and there can be multiple ports 306 connected to the same accessory or to different accessories. Each port 306 can interact with physical transport 302 (which can be the same transport or different transports for different ports 306) to send signals to and receive signals from an accessory connected on that port 306. In some instances, a virtual port 306 can be implemented as a software object (e.g., part of the device firmware); in other instances, port 306 can be connected to or associated with suitable communication hardware. For example, in the case of wireless communication, port 306 can be implemented as a software object to which physical transport 302 can selectively deliver incoming wireless signals that are addressed to port 306 and from which physical transport 302 can receive outgoing signals to be delivered wirelessly to other devices. In the case of wired communication, port 306 can be connected to pins on a connector or the like.

Protocol daemon 304 can extract inbound accessory-protocol messages received on port 306 (or any other active ports) and deliver them to a protocol manager 308. Protocol daemon 304 can also receive outbound accessory-protocol messages from protocol manager 308 and provide the messages to port 306 (or another active port) for delivery to an accessory connected to that port 306.

More specifically, protocol daemon 304 can include a link layer 310, which can be implemented as a software object (e.g., part of the device firmware) executing on appropriate hardware. In some embodiments, link layer 310 operates to create, send, receive, and read packets conforming the accessory protocol (e.g., as described above). For outbound communication, link layer 310 can receive a message from protocol manager 308, encapsulate the message into one or more packets, and send the packets via port 306 to physical transport 302.

For inbound communication, link layer 310 can receive a packet via port 306, extract the message, and provide the message to protocol manager 308 for processing. Where multiple ports 306 are connected, link layer 310 can manage the interleaving of communication across different connected ports 306, particularly where multiple ports share a common physical transport 302 (e.g., a wireless transport using an antenna common to all ports).

Protocol manager 308 (e.g., corresponding to protocol manager 214 of FIG. 2) can receive accessory-protocol messages from protocol daemon 304 and begin the process of interpreting the messages. Protocol manager 308 can receive all messages in the same format, regardless of port; thus the upper levels of the process stack shown in FIG. 3 can be isolated from the transport mechanism. Protocol manager 308 can deliver messages to a support layer 330 that acts as an intermediary between protocol manager 308 (and optionally other low-level device functions) and application 332, or in some instances directly to application 332. Power management unit 216 of FIG. 2 can be implemented in support layer 330, application layer 332, or another software layer within the operating system of the host device.

Protocol manager 308 can include a session layer 312, which can be implemented as a software object (e.g., part of the device firmware) executing on appropriate hardware. Session layer 312 can operate to create and read messages conforming to the accessory protocol (e.g., the protocol described above). For outbound communication, session layer 312 can create a message, e.g., based on function calls from support layer 330 or directly from application 332, and provide the message to link layer 310 to be sent. For inbound communication, link layer 310 can provide a message extracted from a packet to session layer 312 for processing. Session layer 312 can interpret the message and send appropriate function calls, e.g., to support layer 330 or directly to application 332.

In some embodiments, session layer 312 can create and define multiple sessions of different types, each adapted to handle different types of messages and data exchanges. Examples are shown in FIG. 3 as sessions 314, 316, 318, 320. Each session can be assigned a unique session identifier (not shown) such that no two concurrently existing sessions in session layer 312 have the same session identifier. In some embodiments, session identifiers are assigned by the host device as sessions are created, and the host device can communicate the assigned session identifier to the accessory (e.g., via a message on an already-existing session). Different session types can be defined to process different subsets of messages in the accessory protocol, and in some embodiments, the subsets can overlap.

A control session 314 can be configured to process all messages associated with the general message set of the accessory protocol, such as identification and authentication of a connected accessory; control session 314 can also determine what other types of sessions are permitted to communicate with the accessory. This determination can be based on accessory identification and authentication, capabilities of the host device and so on. In some embodiments, control session 314 has a fixed identifier with a value specified by the accessory protocol; this can allow the host and accessory to create control sessions with matching session identifiers without having to expressly communicate the identifier value that will be used.

A message session 316 can be created to handle at least some of the messages from the optional message set of the accessory protocol. For example, many messages may include relatively small amounts of parameters and/or other data, and message session 316 can be used to create and read such messages.

A data transfer session 318 can be created in response to a request to transfer data between the host device and an accessory. Different types of data transfer sessions can be used, including, for example, buffer transfer sessions for discrete data objects (such as a file) whose size is known prior to beginning the transfer and streaming data sessions for open-ended data transfers where the size is not known in advance (e.g., streaming media or application-specific messages that are forwarded to and from applications 332).

A tunnel session 320 can be created to communicate with a target accessory via an intermediary accessory. An example of an intermediary accessory is described below. Tunnel session 320 can receive outbound messages intended for the target accessory (e.g., from another session created for the target accessory) and package the message within a "wrapper" message directed to the intermediary, where the "wrapper" can be, e.g., a message header indicating that the message content originated from tunnel session 320 (and is therefore intended for the target accessory). The intermediary can extract the message and forward the extracted message to the target accessory. A similar process can be used in reverse to deliver messages from the target to the host device.

It is to be understood that the particular session types described herein are illustrative and that other session types can be defined in addition to or instead of those shown in FIG. 3. In some embodiments, multiple sessions with the same accessory or with different accessories can operate concurrently, sharing access to port 306 via link layer 310.

For inbound communication, one of the sessions 314-320 within protocol manager 308 can receive accessory-protocol messages from protocol daemon 304 and begin the process of interpreting the messages. Protocol manager 308 can receive all messages in the same format, regardless of port; thus the upper levels of the process stack shown in FIG. 3 can be isolated from the transport mechanism. Protocol manager 308 can deliver messages to a support layer 330 that acts as an intermediary between protocol manager 308 (and optionally other low-level device functions) and application 332, or in some instances directly to application 332.

Application 332 can include one or more application programs implementing various functions of host device 204. Examples include an interface for navigating a database of media assets and for playing back assets of various types (e.g., audio, video, still images such as photos, etc.). Other examples include World Wide Web browsers, e-mail programs, personal information management applications (e.g., for managing calendar, tasks, contacts, etc.), geographic navigation programs (e.g., using GPS capability where present) and the like. Depending on implementation, application 332 can be part of an operating system of host device 204, a separate program pre-loaded onto host device 204, or a program loaded onto host device 204 by a user.

Some or all of the sessions in session layer 312 can be initiated and terminated on demand. For example, control session 314 can be initiated when a new connection is detected and port 306 is initialized. Control session 314 can be used to process identification and authentication messages received from the accessory and determine whether a message session 316 should be created or not. In some embodiments, control session 314 can remain active until such time as a disconnection or termination of port 306 occurs. Message session 316 can be created in response to control session 314 determining that message session 316 should be created, e.g., upon successful identification and/or authentication of an accessory. Once created, message session 316 can remain active until such time as a disconnection or termination of port 306 occurs or until such time as control session 314 determines that message session 316 should be terminated (e.g., because a new identification message is received from the accessory on port 306).

Other sessions can be initiated (or created) later, in response to specific events. For example, message session 316 can receive a message from the accessory or an application requesting transfer of a data object. In response, message session 316 can initiate a data transfer session 318 to transfer the data object. In some embodiments, message session 316 may be prevented from initiating data transfer session 318 if control session 314 determines that the connected accessory is not authorized to perform the requested data transfer. Data transfer session 318, once created, can begin the transfer of the data object and can terminate once the transfer is complete. If another transfer is subsequently requested, another data transfer session can be created.

As another example, tunnel session 320 can be created in response to a message received from a first accessory (generally an intermediary) indicating that a second accessory has connected to the first accessory. Tunnel session 320 can be terminated if the second accessory disconnects, while other sessions with the first accessory can remain active.

It will be appreciated that the protocol stack described herein is illustrative and that variations and modifications are possible. Host device 202 can support any type of application, and applications can be launched or exited under control of a user or another process. It is contemplated that lower level processes (including support layer 330, protocol manager 308, and protocol daemon 304) can be implemented in software and/or firmware and configured to be automatically started at device power-up and to terminate only on power down or when various abnormal conditions are detected. In some embodiments, protocol manager 308 and protocol daemon 304 are always operating, but session layer 312, link layer 310, and port 306 are initiated only when a compatible accessory is detected and are terminated when no accessories are connected. The processes may go into inactive states to minimize resource consumption when not in use. Further, not all of the levels and processes shown herein are required; for instance, in some embodiments, applications or other system processes might communicate directly with the protocol manager or protocol daemon. In other embodiments, processes shown as separate in FIG. 3 can be combined, or a single block in FIG. 3 can correspond to multiple processes executing on the device.

It is also to be understood that accessory 200 of FIG. 2 can implement a similar protocol stack. Communication requires that both host device 204 and accessory 200 have suitably configured hardware and/or software components to send and receive messages that are mutually comprehensible (e.g., conforming to the accessory protocol at both the link layer and the session layer), but the implementation may be varied as desired.

In accordance with certain embodiments of the present invention, an accessory protocol stack can be used to exchange messages related to controlling operation of a controllable power adapter accessory (e.g., accessory 200 of FIG. 2). For example, host device 204 can draw a desired amount of power from accessory 200, with the desired amount depending on the power requirements of host device 204 and the power capabilities of accessory 200. Examples of such operations will now be described.

For purposes of this description, it is assumed that a number of different types of power adapter accessories can coexist in an accessory ecosystem, and some types of power adapter accessories might not be controllable by a host device. For instance, there can be power adapter accessories that deliver a single fixed voltage or that automatically select between voltages based on the connected host device. It is further assumed that a number of different types of cables can coexist in the accessory ecosystem, and different types of cables might be rated for transmitting different amounts of power. Accordingly, it can be useful for host device 204 to ascertain the type of power adapter and/or cable connected prior to drawing power from a power adapter accessory. Before controlling operation of power adapter accessory 200 to draw power, it can be useful for host device 204 to verify that power adapter accessory 200 is controllable and that an interposed cable (e.g., cable 202) is rated for the amount of power that host device 204 might want to draw.

Figure 4:
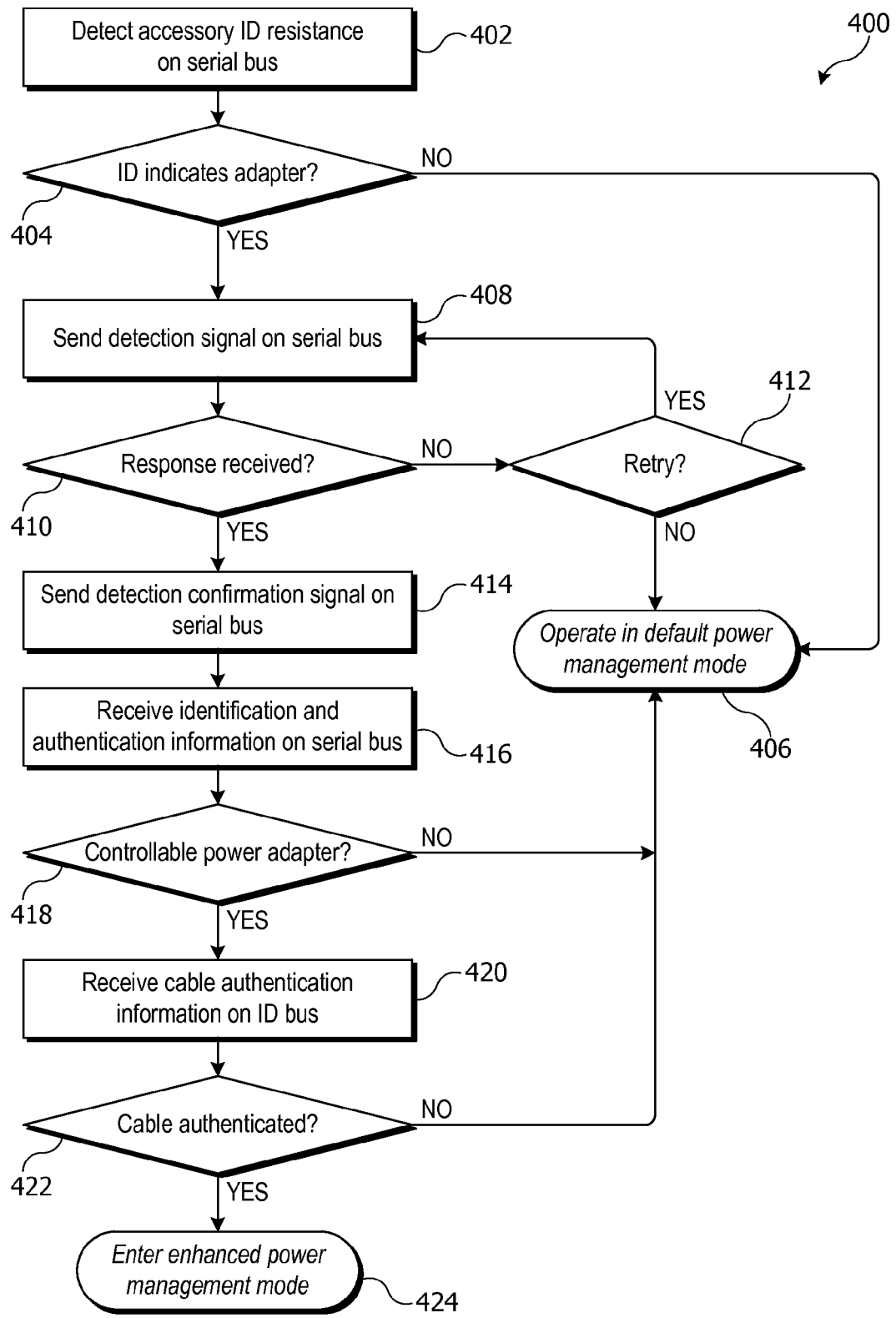
FIG. 4 is a flow diagram of a process usable by a host device to determine whether and how to interoperate with a power adapter accessory according to an embodiment of the present invention.

FIG. 4 is a flow diagram of a process 400 usable by a host device (e.g., host device 204) according to an embodiment of the present invention to determine whether and how to interoperate with a power adapter accessory such as accessory 200, based on the identity and capabilities of the accessory and cable. Process 400 can be implemented, e.g., in protocol manager 214 of host device 204.

Process 400 can begin when host device 204 detects a connection on connector interface 210. For example, at block 402, host device 204 can detect an accessory-identifying resistance applied across pins of serial bus interface 220. In the example of FIG. 2, cable 202 acts as a passthrough for the serial bus, and the detected resistance would be applied by accessory 200. For instance, connector interface 240 of accessory 200 can apply a resistance across pins at serial bus interface 250. The resistance can be a particular value that indicates that the accessory is a power adapter (i.e., an accessory that can provide power to a host device) or a value that more specifically indicates that the accessory belongs to a subcategory of power adapters that includes controllable power adapters. At block 404, if the resistance value indicates that the accessory is not a controllable power adapter (either it is not a power adapter at all or it is a power adapter that is not controllable), process 400 can end at block 406, with host device 204 operating in a default power management mode. The default mode may or may not include drawing power from the accessory, and in some instances, the decision to draw power or not may depend on the particular resistance sensed. For instance, power might not be drawn if the resistance value indicates that the accessory is not a power adapter, if the host device does not recognize the resistance value as corresponding to any type of power adapter, or if the resistance value indicates that the power adapter provides a power level that is not safe for the host device. In some instances, the default power management mode can include drawing the lowest amount of power the accessory can provide.

If, at block 404, the accessory-identifying resistance value indicates that the accessory is (or might be) a controllable power adapter, then host device 204 can attempt to establish communication via serial bus interface 220. For example, at block 408, host device 204 can send a prescribed "detection" byte sequence via serial bus interface 220. Any byte sequence can be prescribed as the detection byte sequence, as long as the accessory can recognize the sequence as the detection sequence, and the accessory protocol specification can prescribe the detection byte sequence. If the accessory recognizes the detection byte sequence, it can respond, e.g., by sending a prescribed "detection response" byte sequence. (This can be the same sequence as the detection sequence or some other sequence.)

At block 410, host device 204 can listen for a response from the accessory (e.g., the detection response byte sequence). If a response is not detected, then at block 412, host device 204 can determine whether to retry sending the detection byte sequence. Retrying can be useful, for instance, if accessory 200 is required to disconnect the identifying resistance from serial bus interface 250 in order to listen for the detection byte sequence. This can create a race condition between host device 204 sending the sequence and serial bus interface 250 being prepared to receive it. Accordingly, host device 204 can be programmed to retry sending the detection byte sequence several times and to stop retrying if no response is received to any of the attempts within a programmed timeout period. For instance, host device 204 can retry every 100 milliseconds and time out if no response is received after 1 second, or retry every 200 milliseconds and time out after 5 seconds. These retry intervals and timeout periods are illustrative and can be modified; in some embodiments, the retry interval can be randomized. A decision to retry at block 412 can return process 400 to block 408. If the decision at block 412 is not to retry, process 400 can end at block 406, with host device 204 operating in the default power management mode as described above.

Assuming the connected accessory is a controllable power adapter accessory, a response (e.g., the prescribed detection response byte sequence) can be received at block 410. Once the response is received, at block 414, host device 204 can send a detection confirmation signal via serial bus interface 220. The detection confirmation signal can be another prescribed byte sequence (which can be the same as the detection byte sequence or a different sequence).

The detection confirmation signal can also include (or be interpreted as) a request for the accessory to send identification and authentication information using an accessory identification message of the accessory protocol. Accordingly, at block 416, host device 204 can receive identification and authentication information via serial bus interface 220. In some embodiments, the identification and authentication information can be communicated using general messages of the accessory protocol, and host device 204 may send specific request messages for some or all of the information. For instance, in some embodiments, authenticating an accessory can include requesting and receiving a digital certificate from the accessory, comparing the digital certificate to digital certificates stored locally on the host device to validate the certificate, sending a random challenge (e.g., a nonce) to the accessory, receiving a signed (e.g., encrypted) version of the challenge from the accessory, and using the certificate to validate the accessory's signature on the challenge. In some embodiments, accessory 200 can invoke functions of authentication module 246 to respond to authentication requests (e.g., requests for a digital certificate and/or signature) sent by host device 204, and host device 204 can invoke functions of authentication controller 212 to generate authentication-related requests and verify responses.

In some embodiments, the information received from the accessory at block 416 can include an accessory protocol message or a sequence of accessory protocol messages that provide information about the accessory's identity and capabilities. Such information can include the accessory name, manufacturer, model and serial number; lists of accessory-protocol messages the accessory can send and/or receive; communication capabilities (e.g., interfaces supported, packet size constraints, data rate constraints, etc.); and other information.

In some embodiments, the accessory identifying information can include information pertaining to the accessory's characteristics as a controllable power adapter. FIG. 5 shows a table 500 listing examples of power-adapter-specific characteristics that can be provided during identification according to an embodiment of the present invention. For each characteristic, a data type and information regarding the value are provided.

ComponentID characteristic 502 can be, for example, an unsigned integer (unit data type) whose value is unique to the particular power adapter. In some instances, the power adapter can be a component of a multi-functional accessory, and component ID 502 can be unique to the power adapter relative to all other components of the multi-functional accessory. ComponentName characteristic 504 can be string whose value provides a human-readable name for the power adapter.

A controllable power adapter can operate in various voltage ranges. The number of voltage ranges defined by the different controllable power adapters can vary (e.g., one or more), and NumVoltageRanges characteristic 506 can be used to indicate the number of distinct voltage ranges for a particular power adapter. For each voltage range, a VoltageRangeInfo characteristic 506 can be provided. VoltageRangeInfo characteristic 506 can be a structured data field that specifies the minimum and maximum voltages (Vmin, Vmax) for the voltage range, the maximum current (Imax) that can be supplied in that voltage range, and additional information related to current limits. For instance, the power adapter may be able to supply higher currents for a limited duration or lower currents for a longer duration, and the available current limits and time durations can be specified as part of VoltageRangeInfo characteristic 506.

In some embodiments, a controllable power adapter accessory can be configured to collect and store diagnostic information, such as usage history information (e.g., hours of operation or more specific dates and times of operation), performance data (e.g., maximum voltage, current, whether errors or overheating occurred), and so on, and different versions of diagnostic information can be defined (e.g., with more or less detail). DiagnosticsVersion characteristic 508 can be an unsigned integer or other value indicating which version of diagnostic information is stored. In some embodiments, some controllable power adapters might store no diagnostic information, and this can be indicated using a designated version number, e.g. version 0.

Referring again to FIG. 4, after receiving the identification and authentication information at block 416, host device 204 can determine, at block 418, whether the connected accessory is a controllable power adapter accessory (e.g., accessory 200) that is authorized for interoperation with host device 204. For example, if authentication operations fail at block 416, or if the accessory does not provide power-adapter-specific characteristics (e.g., the characteristics shown in FIG. 5), host device 204 can determine that it should interoperate with the accessory in the default power management mode, in which case process 400 can end at block 406. In some embodiments, host device 204 can instead determine that it should not interoperate with the accessory at all (e.g., if authentication fails or if the identification information indicates that the accessory is not of a kind that can safely be used with host device 204), in which case host device 204 can disconnect from the accessory, e.g., by switching connector interface 210 into a disconnected state. This may include, e.g., decoupling power bus interface 222 from internal circuitry, allowing pins on serial bus interface 220 and/or ID bus interface 218 to float, and so on.

If, at block 418, host device 204 determines that the connected accessory is a controllable power adapter accessory (e.g., accessory 200) that is authorized for interoperation with host device 204, then at block 420, host device 204 can determine what type of cable (e.g., cable 202) is being used to connect host device 204 to accessory 200. For example, at block 420, host device 204 can receive cable authentication information via ID bus interface 218. Authentication of cable 202 can proceed similarly to accessory authentication at block 416, except that the authentication operations at the cable side (similar to the accessory operations described above) are performed by authentication module 230 within cable 202 rather than by authentication module 246 of accessory 200. In some embodiments, the authentication information provided by authentication module 230 can indicate a power rating associated with the cable. In some embodiments, one category of cable (e.g., a lowest-rated category) may not have an authentication module, in which case the cable would not be authenticated, but host device 204 can infer a low power rating from the failure to authenticate.

At block 422, if cable authentication completes successfully, process 400 can end at block 424, with host device 204 entering an "enhanced" power management mode, in which it can exploit the controllability of power adapter accessory 200. Examples of enhanced power management operations are described below. If cable authentication does not complete successfully, process 400 can end at block 406, with host device 204 entering the default power management mode. Alternatively, when an unauthenticated cable is connected between host device 204 and controllable power adapter accessory 200, host device 204 can assume the unauthenticated cable belongs to a lowest-rated category of cables and can operate controllable power adapter accessory 200 in the enhanced power management mode but subject to limitations based on the unauthenticated cable's assumed rating. In some embodiments, host device 204 can determine that an unauthenticated cable is not safe for use, in which case host device 204 can disable drawing of any power from the accessory.

It will be appreciated that process 400 is illustrative and that variations and modifications are possible. Steps described as sequential may be executed in parallel, order of steps may be varied, and steps may be modified, combined, added or omitted. For instance, authentication and identification operations can be modified, and the particular identification information items provided by a controllable power adapter accessory can be different from the examples described above.

In some embodiments, accessory 200 might be directly connectable to host device 204, without an intervening cable. In some embodiments, a direct connection can be distinguished from an indirect connection based on authentication operations. For example, if host device 204 attempts to authenticate a cable when accessory 200 is directly connected, accessory 200 can receive the authentication request at ID bus interface 248 and can respond, e.g., using authentication module 246. Host device 204 can determine, based on the responses, that the same accessory 200 is authenticating on both the ID bus and the serial bus, and this can indicate a direct connection to accessory 200. Other techniques can also be used to distinguish direct from indirect connections.

In still other embodiments accessory 200 can include a "captive" cable 202 that is permanently, rather than detachably, secured to connector interface 240. In such instances, cable 202 can be designed and rated to safely transmit the maximum power output of accessory 200, and separate authentication of cable 202 can be omitted.

Once host device 204 enters the enhanced power management mode (e.g., at block 424 of process 400), host device 204 can exchange power-management messages (or commands) with controllable power adapter accessory 200. FIG. 6 shows a table 600 listing examples of power-management messages according to an embodiment of the present invention. For each message, a direction (Host (H) to Accessory (A) or Accessory to Host) and message parameters are indicated.

SetVoltage message 602 can be sent from host device 204 to accessory 200 to indicate a target voltage that host device 204 would like to receive on power bus interface 222. The target voltage can be specified, e.g., in millivolts or other convenient unit. In some embodiments, host device 204 can select and set any target voltage that is in any of the voltage ranges identified by accessory 200 during the identification operation (e.g., block 416 of process 400). Accessory 200 can respond by adjusting its output voltage on power bus interface 252 to match the target value (or the nearest voltage to the target that accessory 200 can provide). In some embodiments, host device 204 can specify a desired current in addition to or instead of a voltage.

SetMode message 604 can be sent from host device 204 to accessory 200 to indicate a mode in which power should be delivered. The mode can be specified using an enumerated parameter to designate various options, such as off, auto, normal, and burst. "Off" can indicate that power delivery should be stopped (target voltage set to zero can have the same effect). "Auto" can indicate an automatic mode of operation in which power is delivered until some condition is satisfied (e.g., battery fully charged), after which power delivery can automatically end. "Normal" can indicate a mode of operation in which power is delivered until an instruction to discontinue delivery or change the mode is received. "Burst" can indicate a mode of operation in which the target voltage is supplied at intervals, alternating with intervals of no or low voltage being supplied. Accessory 200 can respond to a SetMode command by operating in the specified mode.

In some embodiments, controllable power adapter accessory 200 can provide status information to host device 204. The status information can indicate various aspects of the operation or condition of accessory 200 and can be sent in approximately real time (e.g., without intentionally introduced delay). Status updates can be provided asynchronously, and host device 204 can elect which updates should be provided, e.g., by subscribing to updates. StartAdapterUpdates message 606 can be sent by host device 204 to indicate a desire to subscribe to particular updates. The updates can be grouped into classes, and the parameters of StartAdapterUpdates message 606 can indicate a list of identifiers of classes to be subscribed, a bitmask indicating whether each class is to be subscribed or unsubscribed or the like.

FIG. 6 lists several examples of update classes that can be defined. A configured voltage update can be sent to indicate that the output voltage has been changed. Configured-voltage updates can be sent, e.g., in response to a SetVoltage message or at other times if accessory 200 determines that the configured output voltage needs to be changed (e.g., to prevent overheating). Mode change updates can be sent, e.g., in response to a SetMode command. State change updates can be sent if the state of accessory 200 changes (e.g., if accessory 200 discontinues providing power in automatic mode because a battery of host device 204 is fully charged, if accessory 200 becomes disconnected from an external power source, or the like).

In some embodiments, accessory 200 can also provide periodic reporting of current operating conditions, e.g., voltage, current and temperature. For example, accessory 200 can compute a moving average of the output voltage, current, or temperature over a fixed time window (e.g., 1 second, 5 seconds, or the like) and can report the computed average at a regular reporting interval (which can be equal to or different from the time window used for the moving average). Thermal limit updates can be sent if and when an operating temperature of accessory 200 becomes close to or exceeds a safe operating temperature. Over current protection or over voltage protection updates can be sent if over-current (or over-voltage) protection functionality is triggered, e.g., due to fluctuations in the input power, faults in power circuitry 244 or other internal circuitry, or the like. Error updates can be sent whenever some error in accessory operation is detected, and error updates can include an error code and/or other information specifying the type of error.

AdapterUpdate message 608 can be used by accessory 200 to send status updates to host device 204. Status updates can be sent if a triggering condition for the update occurs (e.g., changing configuration, nearing or exceeding thermal limits, or other examples described above) while host device 204 is subscribed to the update class to which the update belongs. Each AdapterUpdate message can include a class identifier and additional parameters to communicate specific information about the update (e.g., the configured voltage for a configured-voltage update; the measured average voltage, current or temperature; an error code for an error update).

StopAdapterUpdates message 610 can be sent by host 204 to accessory 200 to stop all adapter updates. No parameter is required. In some embodiments, to change the subscribed set of update classes, host 204 can send a StopAdapterUpdates message followed by a StartAdapterUpdates message that includes the complete desired set of classes to be subscribed. Alternatively, host 204 can simply send a new StartAdapterUpdates message listing the class(es) to be subscribed, with the new request overriding any previous request.

RequestDiagnostics message 612 can be sent by host 204 to accessory 200 to retrieve power adapter-related diagnostic information (e.g., as described above). ReturnDiagnostics message 614 can be sent by accessory 200 to host 204 to provide diagnostic information in response to a received RequestDiagnostics message. In some embodiments, the diagnostic information can be opaque to the accessory protocol. For instance, protocol manager 214 can simply extract a data bundle from a received ReturnDiagnostics message and pass the bundle to other processes on host device 204 for processing. The bundle can be provided to any process within host device 204 (e.g., a troubleshooting application or the like), and host device 204 can also communicate the bundle to other devices.

It will be appreciated that the messages shown in FIG. 6 are illustrative and can be modified or varied as desired. More, fewer, or different combinations of messages can be used, and message structures and parameters can be different from those shown and described.

Figure 7:
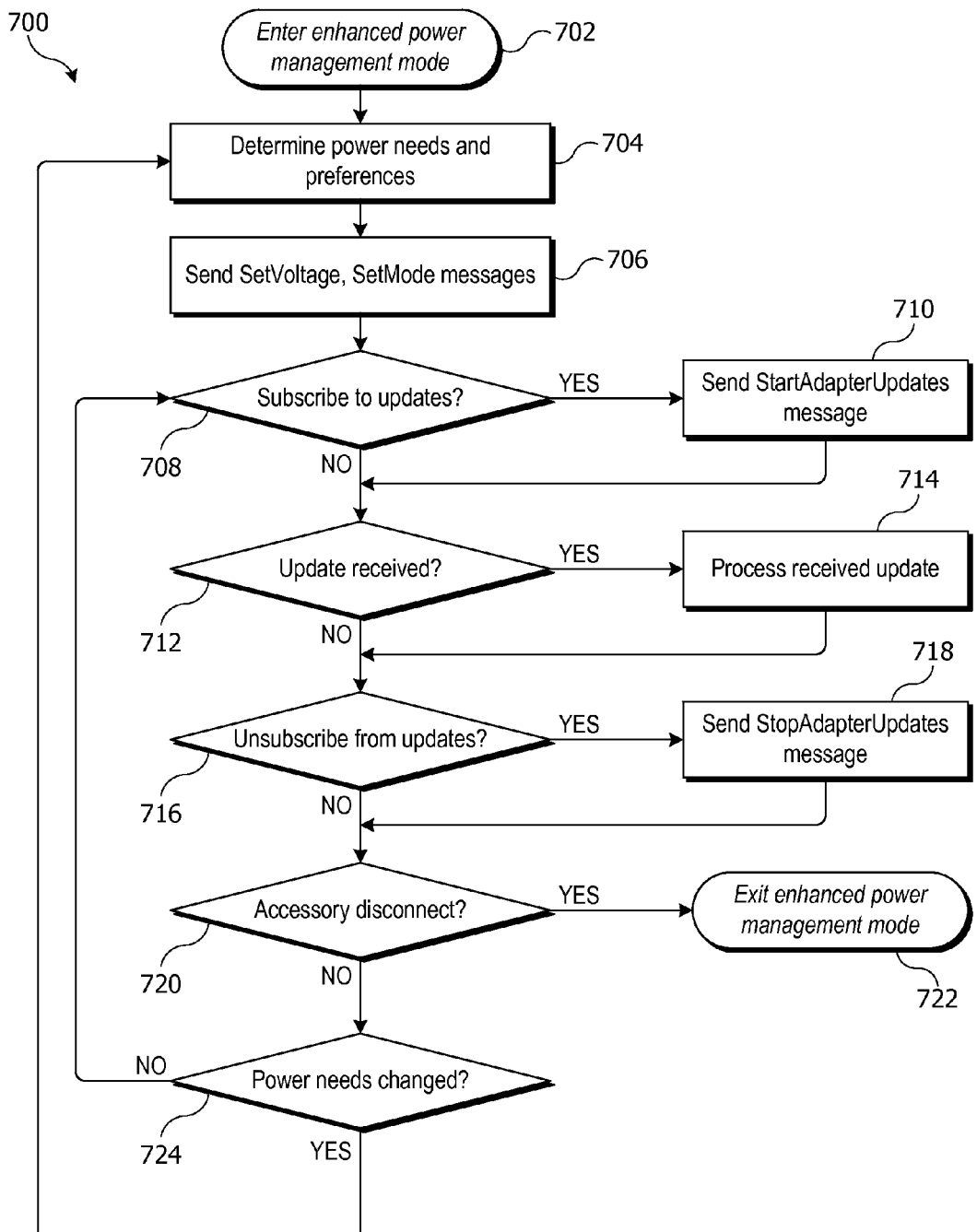
FIG. 7 is a flow diagram of a process for controlling a controllable power adapter accessory according to an embodiment of the present invention.

Further illustrating the use of messages such as those of FIG. 6 to control a controllable power adapter accessory, FIG. 7 is a flow diagram of a process 700 for controlling a controllable power adapter accessory (e.g., accessory 200 of FIG. 2) according to an embodiment of the present invention. Process 700 can be performed by a host device, e.g., host device 204 of FIG. 2. For instance, power management unit 216 can be configured to execute process 700 when protocol manager 214 determines that controllable power adapter accessory 200 is connected.

Process 700 can begin at block 702, when host device 204 enters enhanced power management mode (e.g., when process 400 ends at block 424). At block 704, power management unit 216 can determine the power needs and preferences of host device 204. Power needs can depend on operational details such as whether host device 204 has a battery that should be charged, which power-consuming components of host device 204 are currently active, limits on internal voltages for various components of host device 204, whether host device 204 can draw operating current and/or charging current via power bus interface 222, etc. Power preferences can depend on the power needs and the power-delivery capabilities of controllable power adapter accessory 200 and/or the rating of cable 202.

At block 706, process 700 can specify a power profile for accessory 200, e.g., by sending SetVoltage and/or SetMode messages to accessory 200. The target voltage and mode (and/or other attributes of a power profile) can be selected based on the power needs and preferences determined at block 704. It is to be understood that a different set of messages characterizing the desired power profile of accessory 200 can be substituted. In some embodiments, operations at block 706 can include power management unit 216 determining the power profile to be specified and sending instructions to protocol manager 214 to send corresponding accessory-protocol messages to communication the power profile to accessory 200.

At block 708, process 700 can determine whether to subscribe to status updates from accessory 200. If a subscription is desired, at block 710, host device 204 can send a StartAdapterUpdates message to accessory 200 to indicate which update classes should be subscribed.

At block 712, process 700 can determine whether any AdapterUpdate messages have been received from accessory 200. As noted above, accessory 200 can send AdapterUpdate messages when a triggering condition for the message occurs while host device 204 is subscribed. If an AdapterUpdate message is received, then at block 714, host device 204 can process the received AdapterUpdate message. The particular processing of an AdapterUpdate message is implementation-dependent. For example, host device 204 can record average currents, voltages, and/or temperatures over time and can provide a user interface that graphically displays the recorded data. As another example, host device 204 can generate a user-visible alert in response to an AdapterUpdate message indicating that a thermal limit has been approached or exceeded. These and other processing operations can be implemented or not as desired. In some embodiments, the determination of whether to subscribe to a particular update class can depend on whether host device 204 has implemented any operations for processing updates of a particular type. (Updates that are not processed by host device 204 need not be sent or received.)

At block 716, process 700 can determine whether to unsubscribe from status updates. If so, at block 718, host device 204 can send a StopAdapterUpdates message to accessory 200. In some embodiments, this can be followed by a StartAdapterUpdates to subscribe to a different set of status updates.

At block 720, process 700 can determine whether accessory 200 has disconnected, e.g., whether signal connectivity has been lost at connector interface 210. If so, then enhanced power management can end at block 722.

At block 724, assuming accessory 200 remains connected, process 700 can determine whether the power needs of host device 204 have changed. For example, charging of a battery may have been completed, power-consuming components of host device 204 may be powered up or down (e.g., in response to user interactions), or other changes in the power-consuming behavior of host device 204 may have occurred. In some embodiments, changes in power needs can also be detected based on a received AdapterUpdate message; for instance, it may be desirable to reduce the target voltage if accessory 200 reports possible overheating (e.g., thermal limit near or exceeded). If the power needs have changed, process 700 can return to block 704 to determine new power needs and instruct accessory 200 to change its power profile accordingly. If not, process 700 can continue indefinitely to monitor for received updates and/or changes in power needs, change its update subscription requests, and so on.

It will be appreciated that process 700 is illustrative and that variations and modifications are possible. Steps described as sequential may be executed in parallel, order of steps may be varied, and steps may be modified, combined, added or omitted. For instance, checking for updates, changing update subscription status, detecting accessory disconnection, and changing power needs can be implemented using an interrupt-based mechanism or the like, and checking the various conditions need not occur in a sequential manner.

Figure 8:
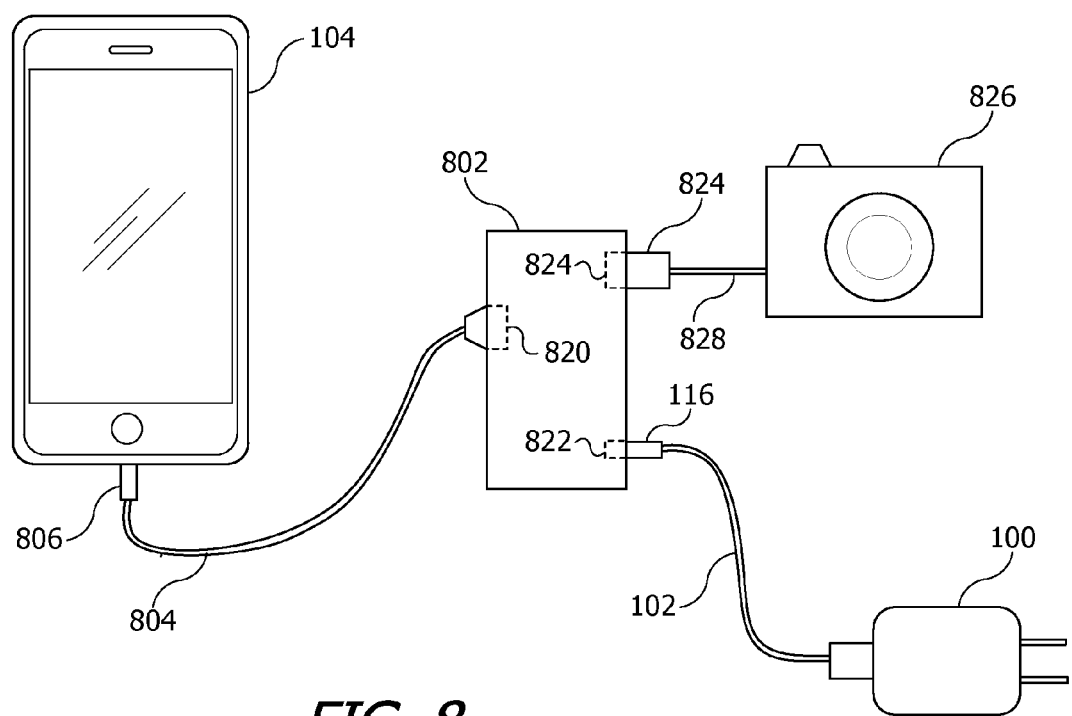
FIG. 8 shows an example where two cables in series are used to connect a host device and a controllable power adapter accessory according to an embodiment of the present invention.

In embodiments described above, a single cable (or no cable) can be used to connect controllable power adapter accessory 200 to host device 204. In some embodiments, a series of cables can be used. FIG. 8 shows an example where two cables in series are used to connect a host device 104 and a controllable power adapter accessory 100 according to an embodiment of the present invention. Host device 104 and power adapter accessory 100 can be the same devices described above with reference to FIG. 1, and cable 102 can be connected to power adapter accessory 100. In this example, however, an intermediary accessory 802 is interposed between cable 102 and host device 104. Intermediary accessory 802 can include a cable 804 that can be connected to host device 104 using a connector plug 806 (which can have the same form factor as connector plug 116 of cable 102). Cable 804 can be but need not be a captive cable with one end permanently connected to intermediary accessory 802.

In this example, intermediary accessory 802 provides three ports: a front port 820 that can be permanently or detachably connected to cable 804, a rear port 822 that can provide a receptacle connector to receive plug connector 116, and an auxiliary port 824 to which electronic equipment 826 (in this case a camera) can be coupled, e.g., using a cable 828. In some embodiments, auxiliary port 824 can implement a standard communication protocol such as USB, and intermediary accessory 802 can include circuitry and/or software capable of translating between the accessory protocol used between accessory 802 and host device 104 and a different protocol used between accessory 802 and equipment 826. This allows accessory 802 to present equipment 826 as an accessory to host device 104, and host device 104 can be unaware of the existence of the translating mechanism or cable 828, while equipment 826 can be unaware of the accessory communication protocol or the presence of host device 104.

Further, accessory 802 can pass through accessory-protocol communications between host device 104 and accessory 100 using a tunneling mechanism such as tunneling session 320 described above.

In the configuration shown in FIG. 8, it can be desirable to use controllable power adapter accessory 100 to supply power to both host device 104 and to intermediary accessory 802. Intermediary accessory 802 may in turn supply power received from power adapter accessory 100 to equipment 826. Power supplied to intermediary accessory 802 is said to be "siphoned" by intermediary accessory 802 because such power, although requested by host device 104, would not actually be available to it. In some embodiments, accessory 802 can request that host device 104 allow it to siphon a particular amount of power. Host device 104 can determine how much power to request from accessory 100 based on its own needs and a siphoning request received from accessory 802. Host device 104 can also notify accessory 802 as to how much power accessory 802 is permitted to siphon, which may be different from the amount requested, depending on the needs of host device 104 and the capabilities of accessory 100.

Figure 9:
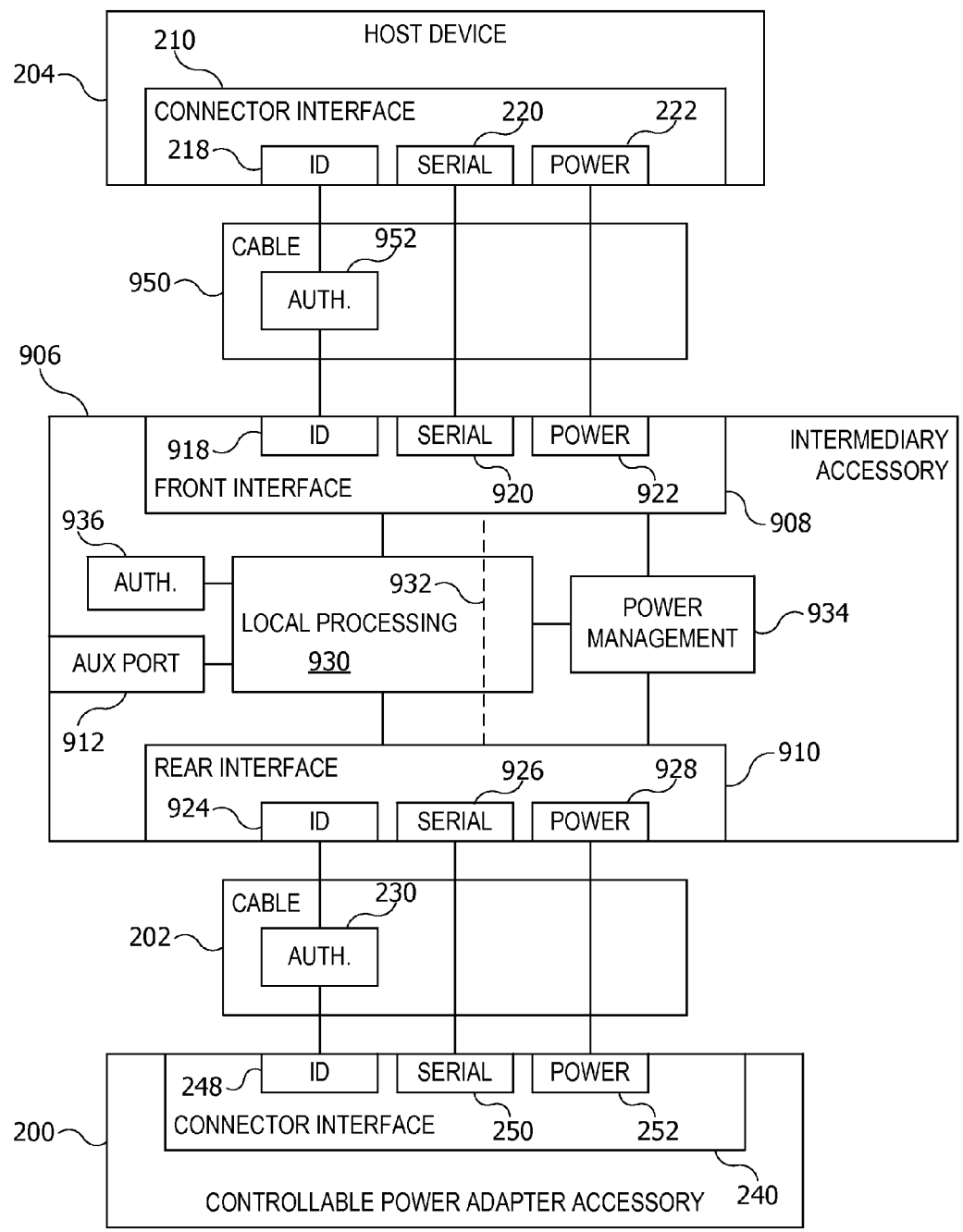
FIG. 9 is a functional block diagram further illustrating connections and communication paths between devices of the type shown in FIG. 8 according to an embodiment of the present invention.

FIG. 9 is a functional block diagram further illustrating connections and communication paths between devices of the type shown in FIG. 8 according to an embodiment of the present invention. Controllable power adapter accessory 200, cable 202, and host device 204 can be as described above with reference to FIG. 2. (Fewer details of these devices are shown in FIG. 9 than in FIG. 2, although it is to be understood that components not shown may be present.)

Intermediary accessory 906 can implement accessory 802 of FIG. 8, with front interface 908 implementing front port 820, rear interface 910 implementing rear port 822, and auxiliary interface 912 implementing auxiliary port 824. Front and rear interfaces 908, 910 can be similar to connector interfaces 210, 240 described above. For instance, front interface 908 can implement an ID bus interface 918, a serial bus interface 920, and a power bus interface 922, while rear interface 910 can implement an ID bus interface 924, a serial bus interface 926, and a power bus interface 928.

Local processing unit 930 can be, e.g., a microcontroller, microprocessor, ASIC, or the like, and can be programmed or otherwise configured to implement various operations described herein. For example, local processing unit 930 can receive accessory protocol messages from host device 204, e.g., via serial interface 920. The received messages can include messages intended for intermediary accessory 906 and for controllable power adapter accessory 200. Local processing unit 930 can determine, e.g., based on message headers (such as whether the message is identified with tunnel session 320 of FIG. 3 or a different session), which accessory is the intended recipient. Local processing unit 930 can process messages intended for intermediary accessory 906 and can forward messages intended for controllable power adapter accessory 200 to serial interface 926 of rear interface 910. Similarly, local processing unit 930 can receive messages intended for host device 204 from controllable power adapter accessory 200 via serial interface 926 and can forward such messages to serial interface 920, e.g., with a message header directed to tunnel session 320. In this manner a tunnel (represented by dashed line 932) can be provided for communication between host device 204 and controllable power adapter accessory 200. Thus, host device 204 and controllable power adapter accessory 200 can interoperate in the manner described above by sending messages to each other through tunnel 932.

Local processing unit 930 can also perform other operations, such as translating between a protocol used to communicate with external equipment (e.g., camera 826 of FIG. 8) via auxiliary port 912 and the accessory communication protocol. Thus, local processing unit 930 can provide communication between host device 204 and external equipment connected to auxiliary port 912. In some instances, host device 204 can be unaware of any protocol translation operations and can communicate with intermediary accessory 906 as if the external equipment were physically incorporated into intermediary accessory 906. Similarly, external equipment (e.g., camera 826 of FIG. 8) can communicate with accessory 906 as if accessory 906 were an endpoint rather than an intermediary.

Power management unit 934 can provide power management operations for intermediary accessory 906. For example, power management unit 934 can siphon some of the power received via power bus interface 928 and divert the siphoned power to operating components of intermediary accessory 906. In some embodiments, siphoned power can also be provided to auxiliary port 912, thereby making power available to connected external equipment.

Authentication module 936 can be similar to authentication module 246 of controllable power adapter accessory 200 (shown in FIG. 2). In some embodiments, authentication module 936 differs from authentication module 246 only with regard to the particular digital certificates stored therein. For instance, authentication module 246 can store a digital certificate associated with controllable power adapter accessories, while authentication module 936 can store a different digital certificate associated with intermediary accessories (or with a particular subset of intermediary accessories such as camera-adapter accessories).

Cable 950 can implement cable 804 of FIG. 8. In some embodiments, cable 950 can be permanently connected to front interface 908 of accessory 906; in other embodiments, cable 950 can be removable. Cable 950 can include its own authentication module 952, which can be similar or identical to authentication module 230 of cable 202. In some embodiments, authentication modules 952 and 230 would be identical if both cables have the same power rating and different otherwise (e.g., using the same algorithms but communicating information that differs in at least one respect indicative of a difference in power rating). In some embodiments where cable 950 is permanently connected to front interface 908, authentication module 952 can be omitted, and host device 204 can infer the power rating of cable 950 from identifying information provided by intermediary accessory 906.

It will be appreciated that FIG. 9 is illustrative and that variations and modifications are possible. While various devices are described herein with reference to particular blocks, it is to be understood that these blocks are defined for convenience of description and are not intended to imply a particular physical arrangement of component parts. Further, the blocks need not correspond to physically distinct components, and the same physical components can be used to implement aspects of multiple blocks. Blocks can be configured to perform various operations, e.g., by programming a processor or providing appropriate control circuitry, and various blocks might or might not be reconfigurable depending on how the initial configuration is obtained. In addition, in some embodiments multiple intermediaries can be present between a host device and a controllable power adapter accessory.

In operation, host device 204 can first detect the presence of intermediary accessory 906 and can communicate with intermediary accessory 906, e.g., to identify and authenticate accessory 906. During identification, accessory 906 can indicate to host device 204 that it has rear interface 910. Accessory 906 can further communicate to host device 204, during identification or a later time, status information indicating whether another accessory (e.g., controllable power adapter accessory 200) is connected to rear interface 910.

When intermediary accessory 906 indicates that another accessory is connected, host device 204 can instruct intermediary accessory 906 to establish tunnel 932. Host device 204 can then obtain identification and authentication information from controllable power adapter accessory 200. In some embodiments, tunnel 932 can tunnel communications to and from ID bus interface 924 distinctly from communications to and from serial bus interface 926, with both types of communications being multiplexed onto serial interface 920 in a manner that indicates whether ID bus interface 924 or serial bus interface 926 was the source. Accordingly, host device 204 can identify and authenticate both accessory 200 and cable 202 in substantially the same manner as described above. Thus, host device 204 can determine whether all cables and intermediary accessories that may be present between itself and controllable power adapter accessory 906 are rated for a particular power that host device 204 may request.

Figure 10:
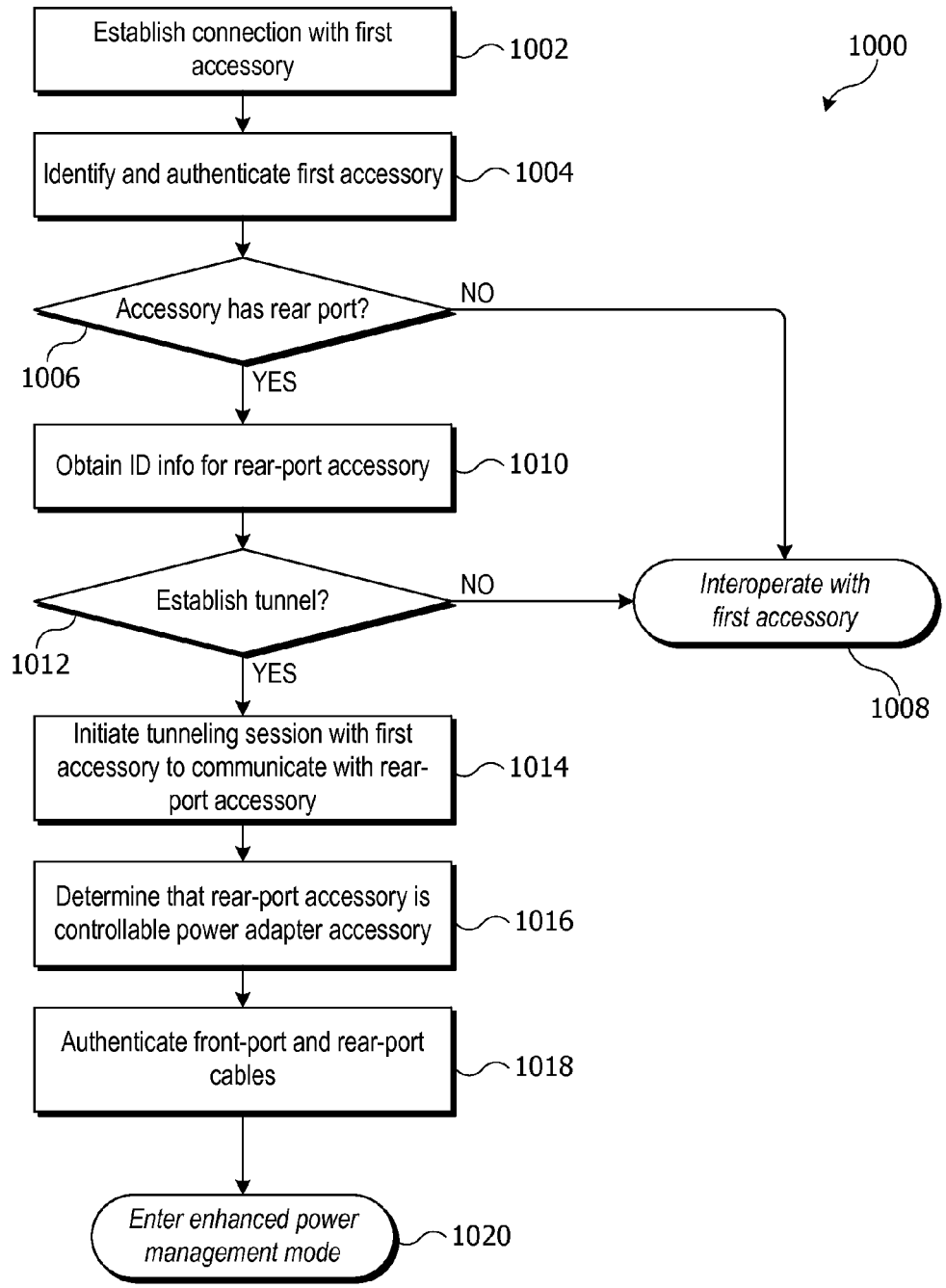
FIG. 10 is a flow diagram of a process for establishing communication between a host device and a controllable power adapter accessory via an intermediary accessory according to an embodiment of the present invention.

FIG. 10 is a flow diagram of a process 1000 for establishing communication between a host device (e.g., host device 204) and a controllable power adapter accessory (e.g., accessory 200) via an intermediary accessory (e.g., accessory 906) according to an embodiment of the present invention. Portions of process 1000 can be similar to portions of process 400 described above.

At block 1002, host device 204 can establish a connection with a first accessory, such as intermediary accessory 906. For example, host device 204 can determine, e.g., based on state changes in ID bus interface 218 and/or serial bus interface 220, that an accessory has connected. At block 1004, host device 204 can identify and authenticate accessory 906. These operations can be generally similar to identification and authentication operations described above, differing in the particulars of identification (e.g., which certificates and accessory information are presented). For instance, in the example of FIG. 9, accessory 906 would not identify as a controllable power adapter but rather as an adapter for external equipment. As noted above, accessory 906 can also indicate during identification that it has rear interface 910. If identification and/or authentication at block 1004 fails, host device 204 can disconnect from the accessory.

At block 1006, if the connected accessory does not indicate that it has a rear port, then host device 204 can infer that further accessories are not connected (chained) to accessory 906, and process 1000 can end at block 1008, with host device 204 interoperating only with the connected first accessory.

If, at block 1006, the connected accessory does have a rear port, then at block 1010, host device 204 can obtain information about an accessory connected on the rear port. In some embodiments, intermediary accessory 906 can read an identification signal received via ID interface 924 or serial interface 926 and can provide a representation of that signal (e.g., a resistance value or data value) to host device 204. If no accessory is connected to rear interface 910, accessory 906 can so inform host device 204.

At block 1012, host device 204 can determine whether to establish a tunnel to the accessory on the rear port. In some embodiments, host device 204 can be configured to establish a tunnel to any accessory that is connected; in other embodiments, whether a tunnel is established can depend on the particular type of accessory connected (e.g., based on the identifying information obtained at block 1010) and/or other operations that may be occurring at host device 204. If host device 204 determines not to establish a tunnel, process 1000 can end at block 1008.

If, at block 1012, host device 204 determines to establish a tunnel, then at block 1014, host device 204 can establish a tunneling session with accessory 906 to enable communication with the rear-port accessory. As described above, establishing a tunneling session can include establishing a session identifier that will be included in packets sent from host device 204 to accessory 906 that are intended for the rear-port accessory and in packets generated by accessory 906 to forward messages received from the rear-port accessory to host device 204. In some embodiments, establishing a tunneling session can include accessory 906 presenting itself as a host device to the rear-port accessory, so that the rear-port accessory can be agnostic to whether communication with host device 204 is occurring directly, through a passive conduit, (e.g., a cable as shown FIG. 2), or through an active intermediary (e.g., intermediary accessory 906 as shown in FIG. 9).

At block 1016, after the tunneling session is established, host device 204 can communicate with the rear-port accessory to determine its identity. For example, identification and authentication as described above with reference to FIG. 4 can be performed. Thus, at block 1016, host device 204 can determine that the rear-port accessory is controllable power adapter accessory 200. (If the rear-port accessory is not a controllable power adapter accessory, process 1000 can end, and other processes can be used to determine what, if any, interaction host device 204 should have with the rear-port accessory.)

Assuming host device 204 determines that controllable power adapter accessory 200 is connected to rear interface 910 of intermediary accessory 906, process 1000 can proceed to block 1018. At block 1018, host device 204 can authenticate the cables connected between itself and controllable power adapter accessory 200. For cable 202, authentication information from authentication module 230 can be relayed via tunnel 932, which can distinguish messages received at (or transmitted to) ID bus interface 924 from messages received at (or transmitted to) serial bus interface 926. Thus, host device 204 can receive the authentication information from authentication module 230 via serial bus interface 220 and treat it as if it had been received via ID bus interface 218. Accordingly, authentication of cable 202 can proceed as described above. Authentication of cable 950 can also use the cable authentication operations described above, with the signals being exchanged via ID bus interface 218.

When all cables have been authenticated, process 1000 can end at block 1020, and host device 204 can enter enhanced power management mode. Operation in the enhanced power management mode can include processes similar or identical to process 600 described above, with communication taking place via tunnel 932. Enhanced power management mode can be terminated if either accessory 906 or accessory 200 disconnects. Intermediary accessory 906 can be but need not be aware of the status or requested power profile of power adapter accessory 200.

Figure 11:
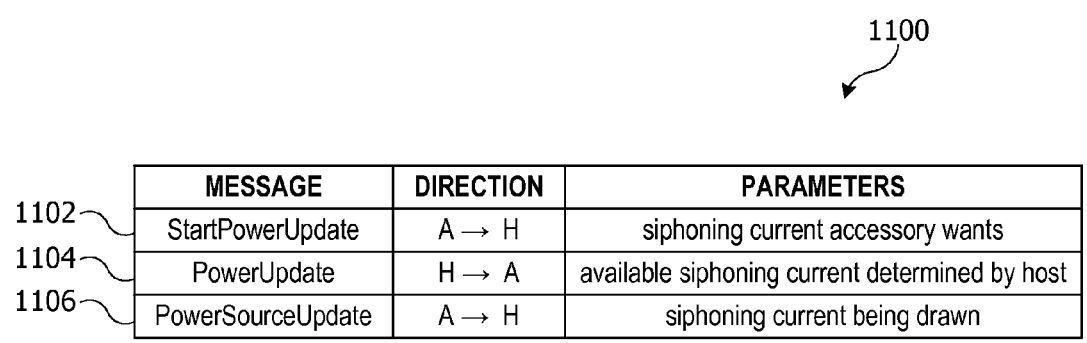
FIG. 11 is a table listing examples of messages relating to power siphoning according to an embodiment of the present invention.

As noted above, in some embodiments, accessory 906 can siphon power from accessory 200, under control of host device 204. This option can be implemented using additional accessory protocol messages that can be exchanged between accessory 906 and host device 200. FIG. 11 is a table 1100 listing examples of messages relating to power siphoning according to an embodiment of the present invention. Other messages can be used in addition to or instead of those shown.

StartPowerUpdate message 1102 can be sent from accessory 906 to host device 204 to indicate that accessory 906 wants to siphon power. Message parameters can include a value indicating the amount of power that accessory 906 wants to siphon (e.g., a current in milliamps). Accessory 906 can determine the amount of siphoned power to request based on its own operating requirements and/or requests for power received from equipment connected on auxiliary port 912. Accessory 906 can send a StartPowerUpdate message whenever it wants to change the amount of power it is permitted to siphon. In some embodiments, accessory 906 can indicate that it is discontinuing power siphoning by sending a StartPowerUpdate message with a power amount equal to zero. In some embodiments, a parameter is not used. If accessory 906 wants to siphon power, it can simply send a StartPowerUpdate message to host device 204 without specifying the amount of power to siphon, and host device 204 can determine the amount of power available for siphoning, e.g., based on the available power and the power needs of host device 204.

PowerUpdate message 1104 can be sent from host device 204 to accessory 906 to indicate that accessory 906 can begin siphoning power. Message parameters can include a value indicating the amount of power that accessory 906 is permitted to siphon (e.g., a current in milliamps). This amount can be the same as or different from the amount requested by accessory 906. In response to a PowerUpdate message, accessory 906 can begin siphoning power at up to (but not more than) the amount specified in the PowerUpdate message. If the amount specified in the PowerUpdate message is less than the amount requested in the StartPowerUpdate message, accessory 906 can adjust its power consumption accordingly (e.g., using less power internally or delivering reduced power to auxiliary port 912) to avoid siphoning more than the permitted amount of power. Host device 204 can send a new PowerUpdate message whenever the available siphoning power changes, e.g., in response to changing power needs of host device 204. In some embodiments, host device 204 can instruct accessory 906 to discontinue power siphoning by sending a PowerUpdate message with the permitted amount of power set to zero.

PowerSourceUpdate message 1106 can be sent by accessory 906 to host device 204 to indicate the amount of power (e.g., current in milliamps) that accessory 906 is currently siphoning. This amount is expected to be equal to or less than the amount specified in the most recent PowerUpdate message sent by host device 204. Accessory 906 can send a PowerSourceUpdate message whenever its siphoning behavior changes. In some embodiments, accessory 906 is expected to send at least one PowerSourceUpdate message in response to each received PowerUpdate message, to confirm that it is siphoning power within the limit set by host device 204.

Figure 12:
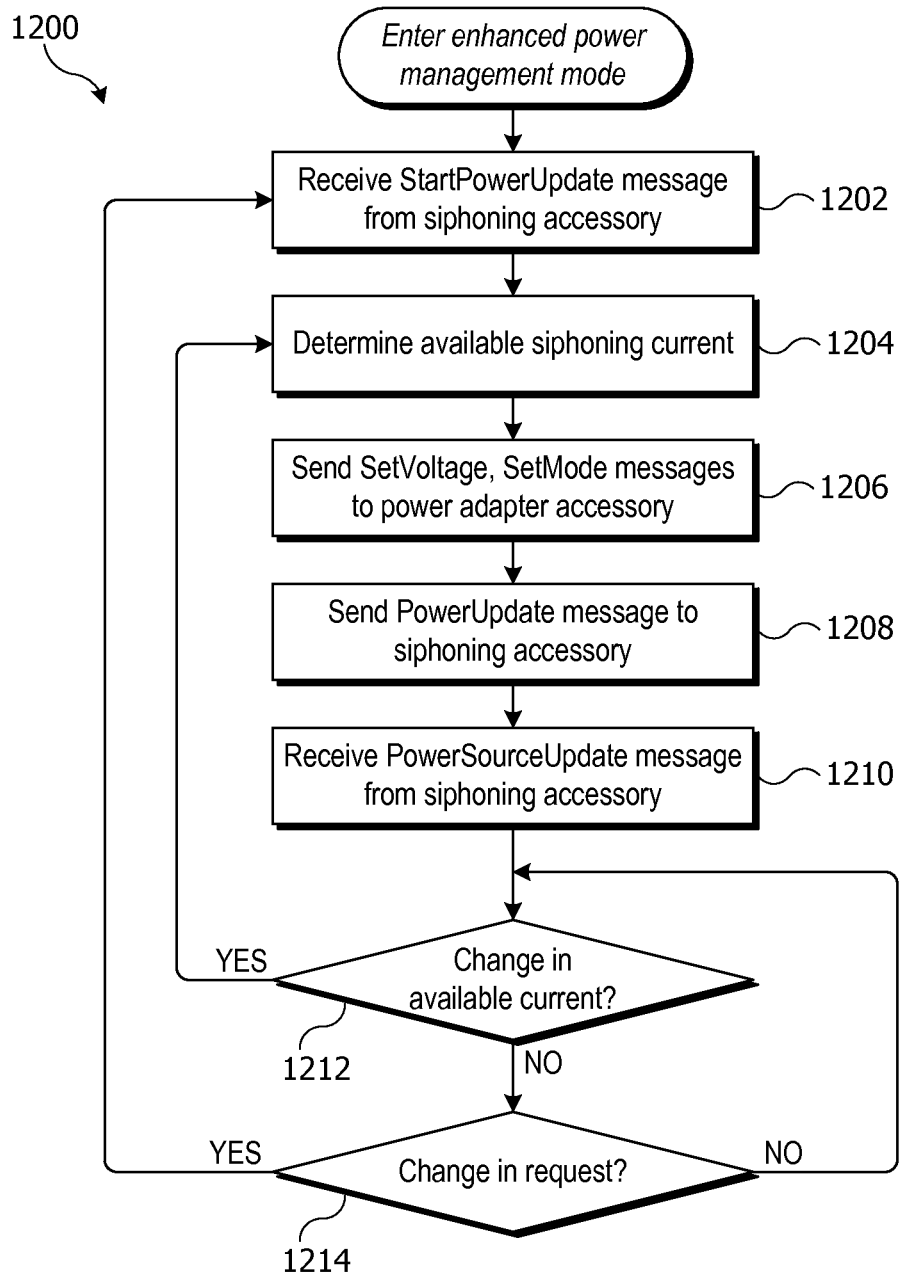
FIG. 12 is a flow diagram of a process that can be implemented in a host device to manage power siphoning by an accessory according to an embodiment of the present invention.

FIG. 12 is a flow diagram of a process 1200 that can be implemented in a host device (e.g., host device 204) to manage power siphoning by an accessory (e.g., accessory 906) according to an embodiment of the present invention. Process 1200 can be executed, e.g., while host device 204 is in the enhanced power management mode described above; thus, host device 204 is connected not only to accessory 906 but also to controllable power adapter accessory 200.

At block 1202, host device 204 can receive a StartPowerUpdate message from accessory 906, indicating that accessory 906 wants to siphon power. At block 1204, host device 204 can determine the amount of power (e.g., current) available for siphoning. The determination can take into account the operating requirements of host device 204 as well as whether it is possible to obtain additional current from controllable power adapter accessory 200, e.g., by changing the power settings for power adapter accessory 200 to allow more current to be drawn. In instances where accessory 902 is requesting less power than is currently being siphoned, host device 204 can determine whether the power settings for power adapter accessory 200 can be changed to reduce total power consumption.

At block 1206, if a change to the power settings for power adapter accessory 200 is appropriate, host device 204 can send a SetVoltage message and/or a SetMode message to accessory 200 to change its power profile. Process 1200 can operate concurrently with process 700, and block 1206 can include communicating changed power needs to process 700.

At block 1208, host device 204 can send a PowerUpdate message to accessory 906 indicating the amount of siphoning current that accessory 906 is now permitted to draw. As noted above, the amount permitted might not be the amount requested, and accessory 906 is expected to adapt its behavior to conform to the limit specified by host device 204. At block 1210, host device 204 can receive a PowerSourceUpdate message from accessory 906 indicating the amount of current being siphoned. In some embodiments, if this amount is higher than the limit established by host device 204, host device 204 can disconnect accessory 906.

At block 1212, host device 204 can determine whether the available siphoning current has changed. For example, available siphoning current might change if the power requirements of host device 202 change, or if the power being supplied by controllable power adapter accessory 200 changes. If a change occurs, process 1200 can return to block 1204 to determine a new amount of available siphoning current.

If, at block 1212, no change has occurred, then at block 1214, host device 204 can determine whether the accessory has requested a change in siphoning current. If so, process 1200 can return to block 1202 to process the change.

Process 1200 can continue until accessory 906 or accessory 200 disconnects. Like other processes described herein, process 1200 is illustrative and that variations and modifications are possible. Steps described as sequential may be executed in parallel, order of steps may be varied, and steps may be modified, combined, added or omitted. For instance, blocks 1212 and 1214 can be implemented in an interrupt-driven manner rather than sequential operations. Other messages or message parameters can be substituted for specific messages shown.

While the invention has been described with respect to specific embodiments, one skilled in the art will recognize that numerous modifications are possible. For example, in some embodiments, a host device (e.g., any of the host devices described above) can receive a device-class signal from an accessory (e.g., any of the accessories described above) via one set of pins of a connector (e.g., the serial bus interface described above). Any number of device-class signals can be recognizable, and in some instances, the device-class signal may correspond to a device class that includes a controllable power adapter accessory. Where this is the case, the host device can establish (or attempt to establish) an accessory-protocol communication channel with the accessory on the first set of pins. Assuming the channel is established, the host device can use the channel to obtain accessory identification information from the accessory. The accessory identification information can include information descriptive of power-supplying capabilities of the accessory (e.g., information as shown in Table 500 of FIG. 5). In some embodiments, the host device can also authenticate the accessory and can limit the amount of power to be drawn from the accessory (e.g., to zero) if the authentication fails (also referred to as the accessory being "not authentic"). Received power can be used for any purpose, including charging a battery of the host device, providing operating power to some or all components of the host device, and/or being delivered by the host device to some other device. Power needs of the host device can change as a function of time (e.g., depending on device activity, battery status, etc.), and the host can request a change in the power profile of the controllable power supply accessory and/or siphoning behavior of an intermediary accessory at any time.

In some embodiments, the host device can also determine a power rating of a cable connected between the host device and the accessory. For instance, as described above, the host device can receive identification and/or authentication information from the cable using a second set of pins on the connector (e.g., the ID bus described above) and can determine the power rating based on this information. In some embodiments, a finite set of power ratings can be defined (e.g., "low" and "high" or specific numerical ratings), with each rating implying a different constraint on the cable's ability to transfer power (e.g., a maximum safe operating voltage, which might be 5 volts for a low-rated cable and 15 volts for a high-rated cable; it is to be understood that a particular rating system is a matter of design choice).

In some embodiments, once the accessory's power-supplying capabilities and the cable's power rating have been determined, the host device can determine a (desired) power profile for the accessory. A power profile can include an amount of power the accessory is to provide (e.g., voltage and/or current) and/or other characteristics of the power to be provided (e.g., a power mode, such as described above). The determination can be based on the power-supplying capability of the accessory, the cable authentication information, and a power need of the host device. The determination can also be based partly on the cable's rating. For instance, if the cable is rated for a lower voltage than the host would prefer to draw, the voltage can be limited to a lower voltage based on the cable's rating. The host device can send a power management message to the accessory via the accessory protocol communication channel, and the power management message can specify the desired power profile.

In some embodiments, a controllable power adapter accessory can receive and respond to various messages described above and can operate to supply power to the host based on the host device's desired power profile. In some embodiments, the supplied power need not exactly match the desired power profile. For instance, the accessory may not be able to supply the exact voltage requested, so the voltage can be somewhat lower.

In some embodiments, during operation, the controllable power adapter accessory can send status updates to the host device in response to conditions that may occur at the accessory. The host device can selectively subscribe to receive status updates, e.g., based on update classes as described above.

In some embodiments, a host device can be connected to a controllable power adapter accessory through an intermediary accessory (e.g., any of the intermediary accessories described above). For instance, the host device can determine that its connector interface is connected to a first cable and that that the first cable is connected to an intermediary accessory. The host device can proceed to establish a first communication channel with the intermediary accessory. Through this channel (e.g., based on accessory identification information as described above), the host device can determine that the intermediary accessory is connected to a second cable and that the second cable is connected to a controllable power adapter accessory. The host device can proceed to establish a second communication channel with the controllable power adapter accessory, and establishing this channel can include establishing a tunnel through the intermediary accessory. The host device can also receive authentication information from both the first and second cables. Accordingly, the determination of the desired power profile can be based on (among other considerations) a power-supplying capability of the accessory, the first and second cable authentication information, and a power need of the host device. The desired power profile can be communicated to the controllable power adapter accessory using the second communication channel.

In some embodiments, the intermediary accessory (when present) can use the first communication channel to send a request to siphon a specified amount of power from the controllable power adapter accessory, and the determination of the desired power profile can be based in part on the requested amount of power to be siphoned. The host device can send a message to the accessory to confirm the permitted amount of power to be siphoned by the intermediary accessory; as described above this can in some instances be less than the requested amount. The intermediary accessory can respond with a status message indicating the amount of power it is actually being siphoned.

Figure 13:
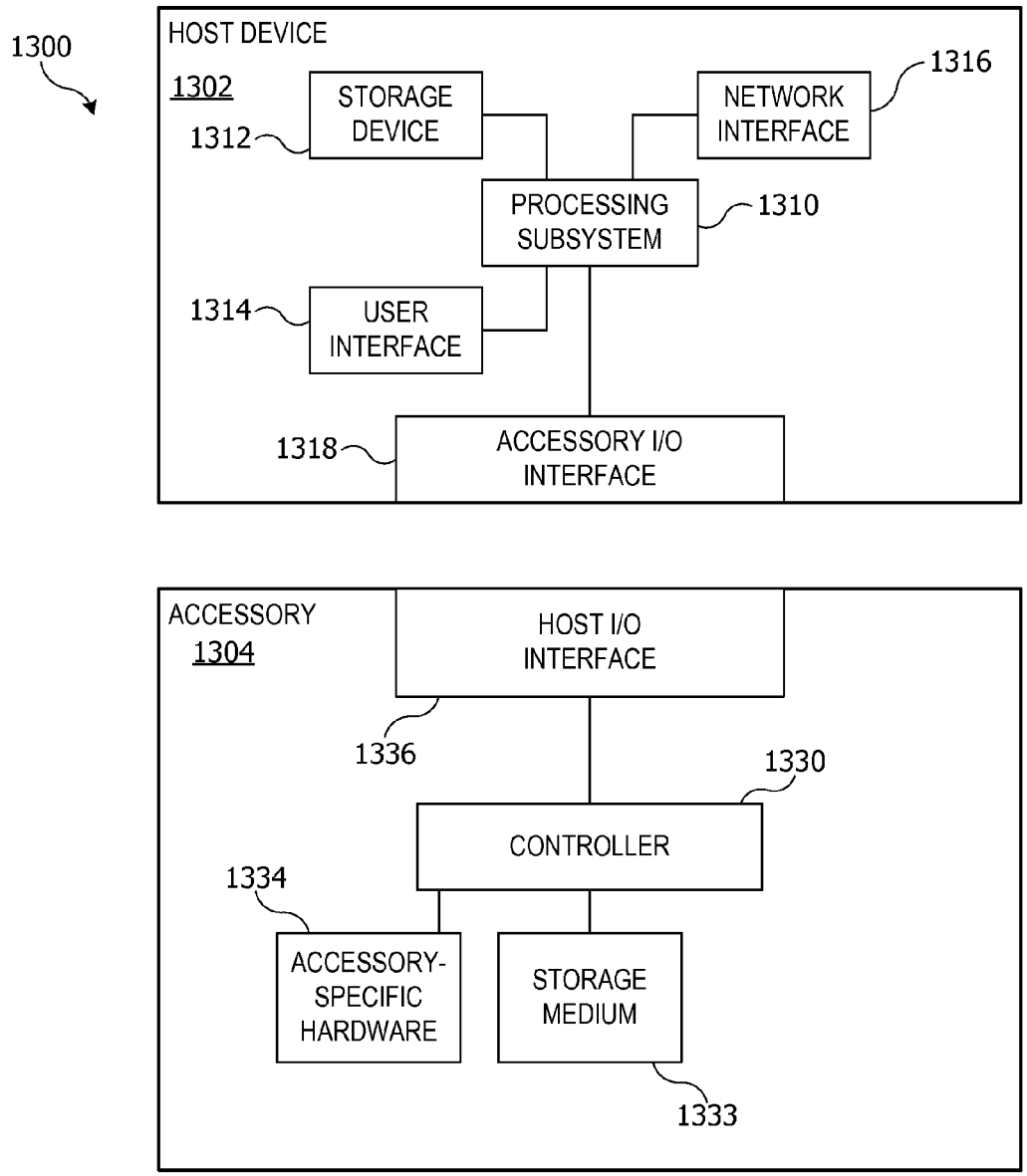
FIG. 13 is a simplified block diagram of a system including a host device and accessory according to an embodiment of the present invention.

Operations and functional blocks described above can be implemented using electronic devices as shown in FIG. 13, which is a simplified block diagram of a system 1300 including a host device 1302 and accessory 1304 according to an embodiment of the present invention. In this embodiment, host device 1302 (e.g., implementing any of the host devices described above) can provide computing and/or communication capability. Host device 1302 can include processing subsystem 1310, storage device 1312, user interface 1314, network interface 1316, and accessory input/output (I/O) interface 1318. Host device 1302 can also include other components (not explicitly shown) such as a battery, power controllers, and other components operable to provide various enhanced capabilities.

Storage device 1312 can be implemented, e.g., using disk, flash memory, or any other non-transitory storage medium, or a combination of media, and can include volatile and/or non-volatile media. In some embodiments, storage device 1312 can store data objects such as audio files, video files, image or artwork files, information about a user's contacts (names, addresses, phone numbers, etc.), information about a user's scheduled appointments and events, notes, and/or other types of information. In some embodiments, storage device 1312 can also store one or more application programs to be executed by processing subsystem 1310 (e.g., video game programs, personal information management programs, media playback programs, etc.) and/or one or more operating system programs or other firmware to implement and support various device-level capabilities including a protocol stack to support communication with an accessory according to an accessory protocol.

User interface 1314 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 1314 to invoke the functionality of host device 1302 and can view and/or hear output from host device 1302 via output devices of user interface 1314.

Processing subsystem 1310 can be implemented as one or more integrated circuits, e.g., one or more single-core or multi-core microprocessors or microcontrollers, examples of which are known in the art. In operation, processing subsystem 1310 can control the operation of host device 1302. In various embodiments, processing subsystem 1310 can execute a variety of programs in response to program code and can maintain multiple concurrently executing programs or processes. At any given time, some or all of the program code to be executed can be resident in processing subsystem 1310 and/or in storage media such as storage device 1312.

Through suitable programming, processing subsystem 1310 can provide various functionality for host device 1302. For example, processing subsystem 1310 can perform any or all of the operations described above. Processing subsystem 1310 can also execute other programs to control other functions of host device 1302, including application programs that may be stored in storage device 1312; in some embodiments, these application programs may include instructions that result in interactions with accessory 1304.

Network interface 1316 can provide voice and/or data communication capability for host device 1302. In some embodiments network interface 1316 can include radio frequency (RF) transceiver components for accessing wireless voice and/or data networks (e.g., using cellular telephone technology, advanced data network technology such as 3G or EDGE, Wi-Fi (IEEE 802.11 family standards), or other mobile communication technologies, or any combination thereof), components for short-range wireless networking (e.g., using Bluetooth standards), GPS receiver components, and/or other components. In some embodiments network interface 1316 can provide wired network connectivity (e.g., Ethernet) in addition to a wireless interface. Network interface 1316 can be implemented using a combination of hardware (e.g., driver circuits, antennas, modulators/demodulators, encoders/decoders, and other analog and/or digital signal processing circuits) and software components.

Accessory I/O interface 1318 (which can include connector interface 210 of FIG. 2) can allow host device 1302 to communicate with various accessories, including controllable power adapter accessories as described above. For example, accessory I/O interface 1318 can support connections to a computer, an external keyboard, a speaker dock or media playback station, a digital camera, a radio tuner, an in-vehicle entertainment system or head unit, an external video device, a memory card reader, and so on. In some embodiments, accessory I/O interface 1318 can support wireless communication (e.g., via Wi-Fi, Bluetooth, or other wireless transports). The same wireless transceiver hardware as network interface 1316 can be used for both networking and accessory communication. Additionally or instead, accessory I/O interface 1318 can include a connector, such as connectors corresponding to the connectors used in various iPod®, iPhone®, and iPad® products developed and sold by Apple Inc., as well as supporting circuitry. Thus, accessory I/O interface 1318 can support multiple communication channels, and a given accessory can use any or all of these channels.

Accessory 1304 (e.g., implementing any of the accessories described above, such as controllable power adapter accessory 200 or intermediary accessory 906) can include controller 1330, storage medium 1333, other accessory-specific hardware 1334, and host I/O interface 1336. Accessory 1304 is representative of a broad class of accessories that can interoperate with a host device, and such accessories can vary widely in capability, complexity, and form factor. Various accessories may include components not explicitly shown in FIG. 13, including but not limited to storage devices (disk, flash memory, etc.) with fixed or removable storage media; video screens, speakers, or ports for connecting to external audio/video devices; camera components such as lenses, image sensors, and controls for same (e.g., aperture, zoom, exposure time, frame rate, etc.); microphones for recording audio (either alone or in connection with video recording); power components; and so on. In addition, some accessories may provide an additional interface (not shown in FIG. 13) that can connect to and communicate with another accessory, such as rear interface 910 of accessory 906).

Controller 1330 can include, e.g., one or more single-core or multi-core microprocessors and/or microcontrollers executing program code to perform various functions associated with accessory 1304. For example, controller 1330 can implement power management and communication operations as described above. Controller 1330 can also implement a protocol stack (e.g., similar to stack 300 of FIG. 3) to support communication with a host device according to an accessory protocol.

Storage medium 1333 can incorporate any type of data storage media, including but not limited to disk, flash memory, or any other non-transitory storage medium, or a combination of media, and can include volatile and/or non-volatile media. Storage medium 1333 can be used to store program code to be executed by controller 1330, data objects received from host device 1302, and any other data or instructions that may be generated and/or used in the operation of accessory 1304.

Accessory-specific hardware 1334 can include any other components that may be present in accessory 1304 to enable its functionality. For example, in various embodiments accessory-specific hardware 1334 can include user interface components; storage media; GPS receiver; a network interface; power adapter and/or power management circuitry; environmental sensors (e.g., temperature sensor, pressure sensor, accelerometer, chemical sensor, etc.); and so on. It is to be understood that any type of accessory functionality can be supported by providing appropriate accessory-specific hardware 1334.

Host I/O interface 1336 (which can include connector interface 240 for accessory 200 or front connector interface 908 for accessory 906) can allow accessory 1304 to communicate with host device 1302. In some embodiments, host I/O interface 1336 can support wireless communication (e.g., via Wi-Fi, Bluetooth, or other wireless transports) and can include appropriate transceiver and signal processing circuitry and software or firmware. Additionally or instead, host I/O interface 1336 can include a connector that mates directly with a connector included in host device 1302, such as a connector complementary to the connectors used in various iPod®, iPhone®, and iPad® products.

Accessory 1304 can be any electronic apparatus that interacts with host device 1302. In some embodiments, accessory 1304 can provide operations described above, as well as other functionality as desired.

It will be appreciated that the system configurations and components described herein are illustrative and that variations and modifications are possible. The host device and/or accessory may have other capabilities not specifically described herein (e.g., mobile phone, global positioning system (GPS), broadband data communication, Internet connectivity, etc.).

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. (It is understood that "storage" of data is distinct from propagation of data using transitory media such as carrier waves.) Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method of operating a host device, the method comprising, by the host device:
   receiving a device-class signal from an accessory via a first set of pins of a connector of the host device, the device-class signal corresponding to a device class that includes a controllable power adapter accessory;
   establishing an accessory-protocol communication channel with the accessory using the first set of pins;
   obtaining, via the accessory-protocol communication channel, accessory identification information from the accessory, the accessory identification information including information descriptive of a controllable power-supplying capability of the accessory;
   receiving, via a second set of pins of the connector, cable authentication information from a cable connected between the host device and the accessory;

determining a power rating of the cable based at least in part on the cable authentication information;

determining a power profile for power to be supplied by the accessory to the host device via the cable, the determination of the power profile being based on the power-supplying capability of the accessory, the power rating of the cable, and a power need of the host device; and sending a power management message to the accessory via the accessory-protocol communication channel, the power management message specifying the power profile.

2. The method of claim 1 wherein sending the power management message includes sending a first power management message specifying a voltage for the power profile.

3. The method of claim 2 wherein sending the power management message further includes sending a second power management message specifying a power mode for the power profile.

4. The method of claim 3 wherein the power mode is selected from a group of available power modes that includes at least a burst mode, a normal mode, an automatic mode, and an off mode.

5. The method of claim 1 wherein establishing the accessory-protocol communication channel includes:

sending, on the first set of pins, responsive to the device-class signal, a detection byte sequence corresponding to an accessory communication protocol; and receiving, via the first set of pins, a detection-response byte sequence from the accessory.

6. The method of claim 1 further comprising:

obtaining, via the accessory-protocol communication channel, accessory authentication information for the accessory; and determining, based at least in part on the accessory authentication information, whether the accessory is authentic; and limiting an amount of power drawn from the accessory by the host device in the event that the accessory is not authentic.

7. The method of claim 6 wherein the amount of power drawn from the accessory in the event that the accessory is not authentic is limited to zero.

8. The method of claim 1 wherein determining the power profile for the accessory includes:

limiting an amount of power to be drawn from the accessory based on the power rating of the cable.

9. The method of claim 8 wherein determining the power profile for the accessory includes:

limiting the amount of power to be drawn from the accessory in the event that the cable authentication information indicates that the cable is not authentic.

10. The method of claim 1 further comprising:

receiving, by the host device, a status update message from the accessory, the status update message indicating a condition occurring at the accessory.

11. The method of claim 10 wherein the status update message belongs to a first one of a plurality of status update classes, the method further comprising:

subscribing, by the host device, to one or more of the status update classes including the first one of the status update classes, wherein the status update message is received while the host device is subscribed to the first one of the status update classes.

12. The method of claim 11 wherein the status update classes include at least two of:

a configured voltage update class;

an average voltage update class;

an average current update class;

an average temperature update class;

a thermal limit update class;

an over current protection update class;

an over voltage protection update class;

a mode change update class;

a state change update class; or an error update class.

13. A method of operating a host device, the method comprising, by the host device:

determining that an interface of the host device is connected to a first cable and that that the first cable is connected to an intermediary accessory, establishing a first communication channel with the intermediary accessory;

determining that the intermediary accessory is connected to a second cable and that the second cable is connected to a controllable power adapter accessory;

establishing a second communication channel with the controllable power adapter accessory, wherein establishing the second communication channel includes establishing a tunnel through the intermediary accessory;

receiving first cable authentication information from the first cable;

receiving second cable authentication information from the second cable;

determining a desired power profile for the controllable power adapter accessory based at least in part on a power-supplying capability of the controllable power adapter accessory, the first and second cable authentication information, and a power need of the host device; and sending a power management message via the second communication channel to the controllable power adapter accessory, the power management message specifying the desired power profile for the controllable power adapter accessory.

14. The method of claim 13 further comprising:

receiving, from the intermediary accessory via the first communication channel, a request to siphon power from the controllable power adapter accessory; and sending, to the intermediary accessory via the first communication channel, a siphoning control message to the intermediary accessory via the first communication channel, the siphoning control message specifying a permitted amount of power to be siphoned by the intermediary accessory.

15. The method of claim 14 wherein the request to siphon power specifies a requested amount of power to be siphoned and wherein the desired power profile is determined based in part on the requested amount of power to be siphoned.

16. The method of claim 15 further comprising:

receiving, from the intermediary accessory via the first communication channel, a status message indicating an amount of power actually being siphoned by the intermediary accessory.

17. A host device comprising:

a connector interface including an ID bus interface, a serial bus interface, and a power bus interface;

a protocol manager coupled to the connector interface and configured to exchange messages conforming to an accessory protocol with an accessory via the serial bus interface of the connector interface, wherein the messages include:

an identification message receivable by the host device, the identification message including power information specifying one or more controllable power parameters for power supplied by a controllable power supply accessory; and a power-control message sendable by the host device to the controllable power supply accessory, the power-control message specifying at least one characteristic of a power profile to be delivered from the controllable power supply accessory to the power bus interface; and a power management unit coupled to the protocol manager and the connector interface, the power management unit being configured to:
receive the power information from the protocol manager;
determine a power need of the host device;
determine a desired characteristic for a power profile based at least in part on the power need and the power information; and
communicate the desired characteristic to the protocol manager, wherein the protocol manager is further configured to send the power-control message to the controllable power supply accessory to specify the desired characteristic of the power profile in response to the communication from the power management unit.

18. The host device of claim 17 further comprising:

an authentication controller coupled to the protocol manager, wherein the protocol manager is further configured to:
receive accessory authentication information for the controllable power supply accessory via the serial bus interface; and
use the authentication controller to verify the accessory authentication information,
wherein the power management unit is further configured to determine the desired characteristic for the power profile based in part on whether the accessory authentication information is verified.

19. The host device of claim 18 wherein the protocol manager is further configured to:
receive, via the ID bus interface of the connector interface, first cable authentication information for a first cable connected between the host device and the controllable power supply accessory; and
use the authentication controller to verify the first cable authentication information,
wherein the power management unit is further configured to determine the desired characteristic for the power profile based in part on whether the first cable authentication information is verified.

20. The host device of claim 18 wherein the protocol manager is further configured to:
establish a communication path for exchanging messages conforming to the accessory protocol with an intermediary accessory through a first cable, wherein the intermediary accessory is connected to the controllable power accessory using a second cable;
establish a communication path for exchanging messages conforming to the accessory protocol with the controllable power adapter accessory using a tunnel established through the intermediary accessory using the first and second cables;
receive, via the ID bus interface of the connector interface, first cable authentication information for the first cable;
receive, via the tunnel, second cable authentication information for the second cable;
use the authentication controller to verify the first cable authentication information and the second cable authentication information,
wherein the power management unit is further configured to determine the desired characteristic for the power profile based in part on whether the first cable authentication information and the second cable authentication information are verified.

* * * * *